United States Patent
Kuehner et al.

(10) Patent No.: US 11,884,204 B1
(45) Date of Patent: Jan. 30, 2024

(54) OPERATOR VIGILANCE USING DISENGAGEMENTS AND HEADLIGHT MODIFICATIONS

(71) Applicant: WOVEN ALPHA, INC., Tokyo (JP)

(72) Inventors: Manuel Ludwig Kuehner, Mountain View, CA (US); Hiroshi Yasuda, San Francisco, CA (US)

(73) Assignee: WOVEN BY TOYOTA, INC., Tokyo (JP)

(*) Notice: Subject to any disclaimer, the term of this patent is extended or adjusted under 35 U.S.C. 154(b) by 0 days.

(21) Appl. No.: 18/153,988

(22) Filed: Jan. 12, 2023

(51) Int. Cl.
*B60Q 1/14* (2006.01)
*B60Q 1/08* (2006.01)

(52) U.S. Cl.
CPC ............ *B60Q 1/143* (2013.01); *B60Q 1/085* (2013.01); *B60Q 2300/45* (2013.01); *B60Q 2400/20* (2013.01)

(58) Field of Classification Search
CPC ........ B60Q 1/085; B60Q 1/143; B60Q 1/507; B60Q 2800/10
See application file for complete search history.

(56) References Cited

U.S. PATENT DOCUMENTS

| | | | |
|---|---|---|---|
| 9,126,529 B2 | 9/2015 | Nordbruch | |
| 9,798,323 B2 | 10/2017 | Tsimhoni | |
| 10,513,216 B2 | 12/2019 | Stählin | |
| 2013/0051042 A1 | 2/2013 | Nordbruch | |
| 2016/0167648 A1* | 6/2016 | James | B60Q 1/547 701/28 |
| 2018/0136643 A1* | 5/2018 | Tao | G05D 1/0022 |
| 2021/0129857 A1 | 5/2021 | Cullinane | |

FOREIGN PATENT DOCUMENTS

| | | |
|---|---|---|
| DE | 102010007866 | 8/2011 |
| DE | 102011076644 | 11/2012 |
| DE | 102012009908 | 1/2013 |
| DE | 102018122240 | 3/2020 |

* cited by examiner

*Primary Examiner* — Robert J May
(74) *Attorney, Agent, or Firm* — SHEPPARD, MULLIN, RICHTER & HAMPTON LLP; Hector A. Agdeppa; Daniel N. Yannuzzi

(57) ABSTRACT

Systems and methods are provided for modulating headlight characteristics according to a calculated probability of future unplanned disengagement of advanced driver-assistance systems or automated driving systems, collectively referred to as driving automation systems. In particular, some embodiments aim to alert drivers of both a likelihood of unplanned disengagement, as well as a source of unplanned disengagement.

20 Claims, 10 Drawing Sheets

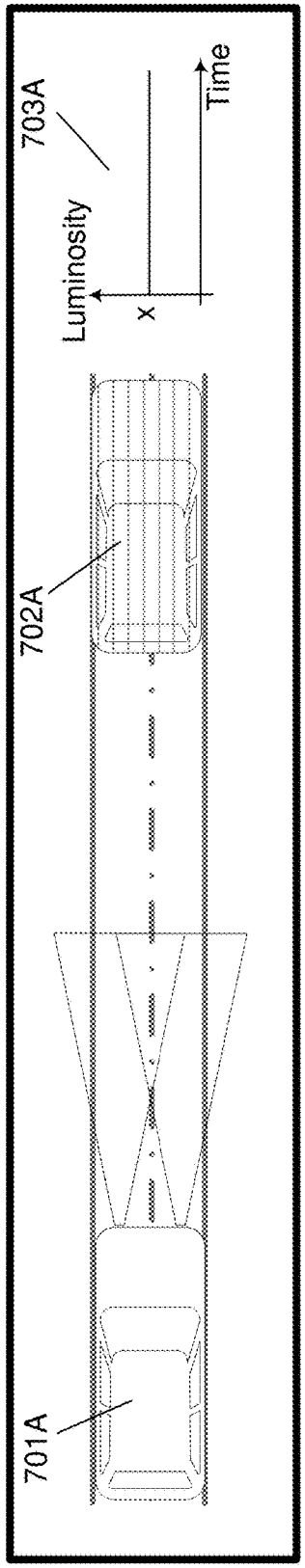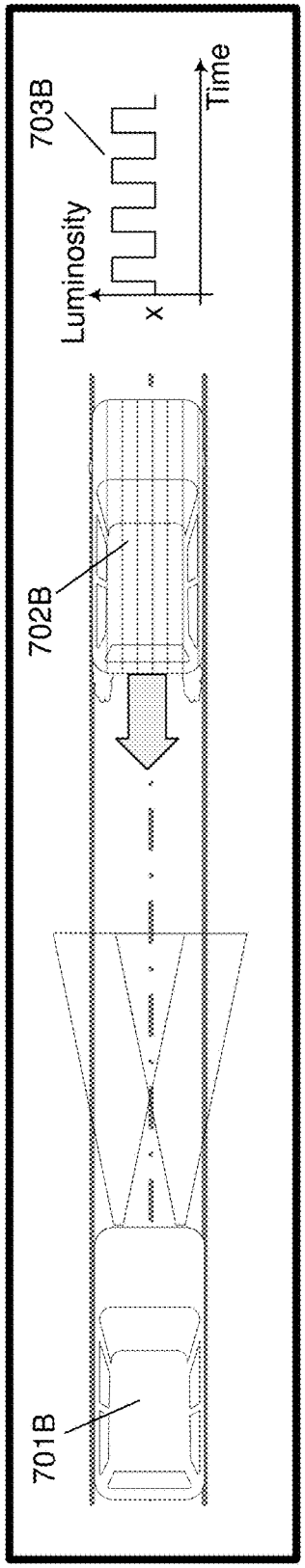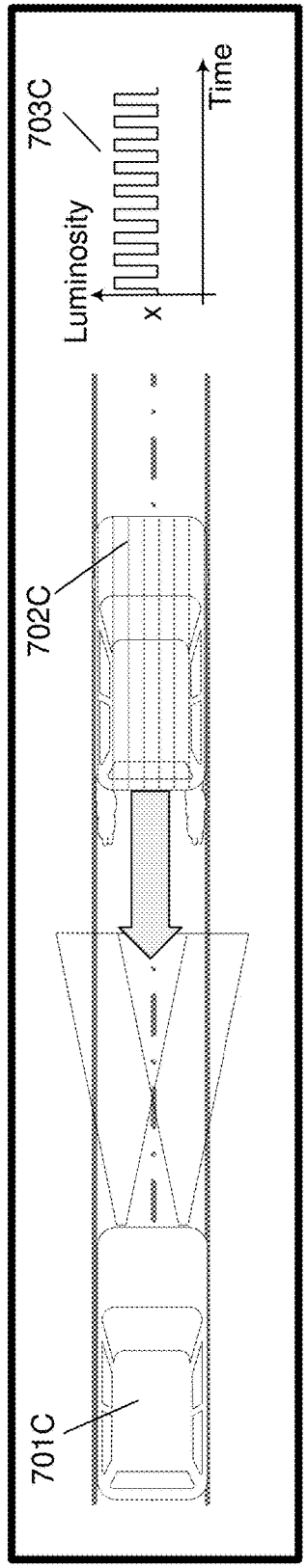

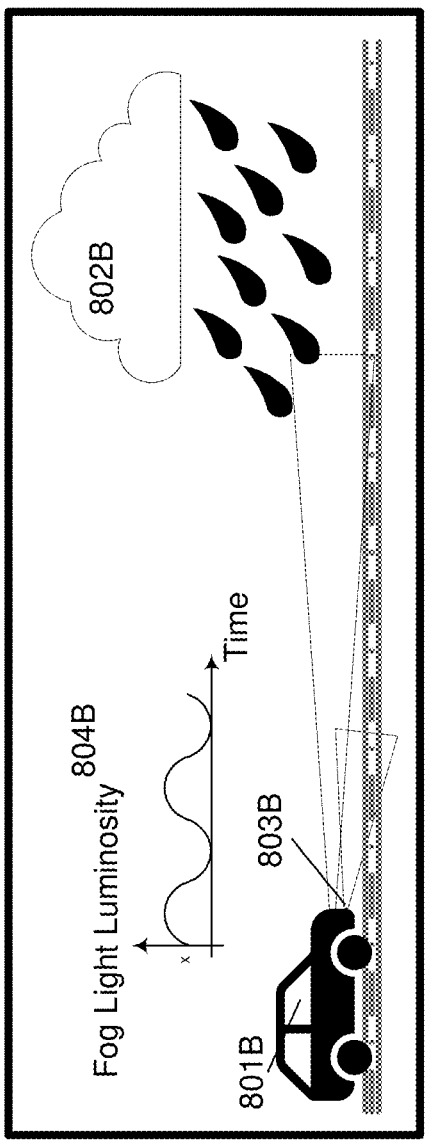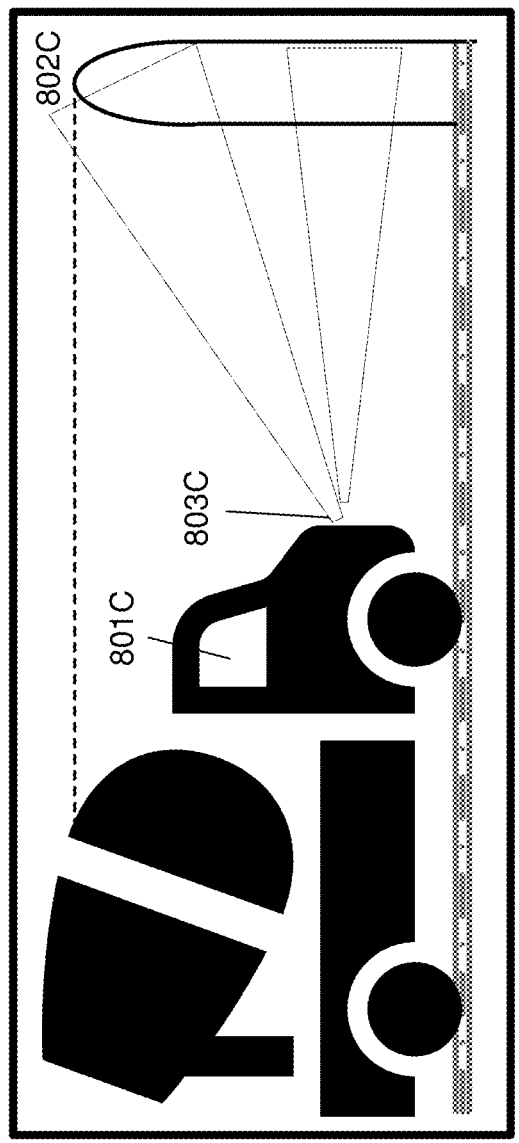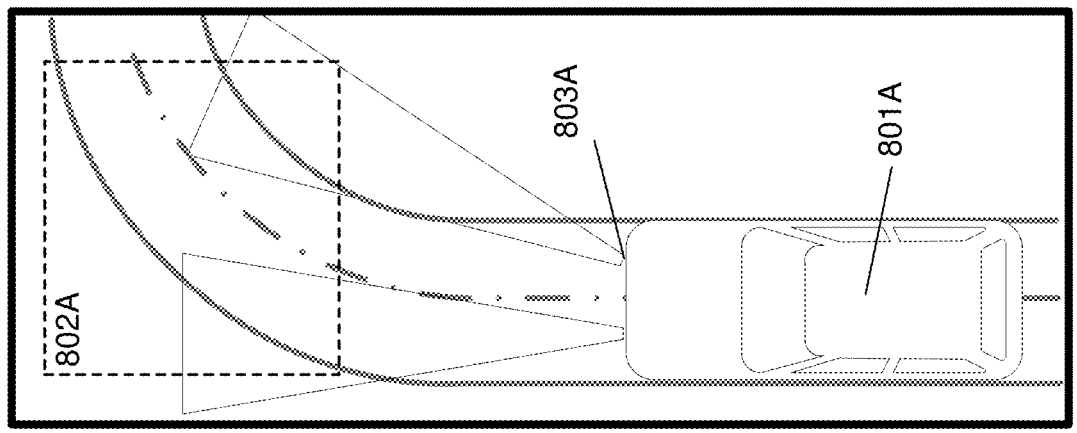
FIG. 8B
FIG. 8C
FIG. 8A

OPERATOR VIGILANCE USING DISENGAGEMENTS AND HEADLIGHT MODIFICATIONS

TECHNICAL FIELD

The present disclosure relates generally to automotive systems and technologies, and more particularly, some examples relate to a system of warning an occupant of a vehicle employing an advanced driver-assistance system ("ADAS") or automated driving system ("ADS"), collectively referred to herein as driving automation systems ("DAS"), of a likelihood that the ADAS will be fully or partially disengaged. More specifically, some implementations may relate to modulating the shape, color, and/or intensity of area illuminated by the vehicle's headlights as a method of warning the occupant.

DESCRIPTION OF RELATED ART

In vehicle employing a driving automation system, the role of vehicle operation is shared among an occupant(s), typically a driver of the vehicle, and the vehicle. DAS may categorize a suite of driving roles assumed by the vehicle into various autonomous driving levels. For instance, at autonomous driving level 2 ("L2") mode, the vehicle retains lateral (e.g., steering) and longitudinal (e.g., braking and acceleration) control, while the occupant(s) supervises vehicle operation. In other words, the role of the occupant(s) as a driver is never completely relinquished. During an emergency, the occupant(s) must take immediate control of both the lateral and longitudinal control to steer the vehicle to safety. In the context of this disclosure, the suite of driving roles assumed by the vehicle decreases with the autonomous driving level, e.g., a change from L2 to autonomous driving level 1 ("L1") entails a situation where the vehicle will be relinquishing driving roles for the occupant of the vehicle to assume. Driving automation systems levels and/or modes may be categorized according to any useful convention (e.g., target driving environment, target occupant experience).

BRIEF SUMMARY OF THE DISCLOSURE

According to various embodiments of the disclosed technology, a method of alerting an occupant of a vehicle employing a DAS comprises: receiving data relating to a future driving environment, calculating a likelihood of unplanned disengagement of the DAS based on the data, and alerting the occupant by modulating headlight characteristics, wherein the intensity of the modulation is proportional with the calculated likelihood of unplanned disengagement of the DAS.

In some embodiments, the modulation of headlight characteristics comprises oscillating the luminosity of a light mounted to the vehicle in response to the calculated likelihood of unplanned disengagement of the DAS exceeding a threshold value.

In some embodiments, the vehicle comprises a headlight housing, the headlight housing comprises a plurality of independently controlled light sources, and the modulation of headlight characteristics comprises altering the lighting characteristics of an independently controlled light sources within the plurality of independently controlled light sources.

In some embodiments, the vehicle comprises a headlight housing, the headlight housing comprises a plurality of independently controlled shutters, and the modulation of headlight characteristics comprises actuating an independently controlled shutter within the plurality of independently controlled light sources, wherein the actuating of the independently controlled shutter results in blocking of light emitted from a light source within the headlight housing.

In some embodiments, the modulation of headlight characteristics comprises rotating a light mounted to the vehicle along a horizontal plane in order to further indicate to the occupant that a source of the calculated likelihood of unplanned disengagement of the DAS includes a change in road geometry.

In some embodiments, the modulation of headlight characteristics comprises rotating a light mounted to the vehicle along a vertical plane in order to further indicate to the occupant that a source of the calculated likelihood of unplanned disengagement of the DAS includes a detected obstacle in the path of the vehicle.

In some embodiments, the modulation of headlight characteristics comprises activating a light mounted to the vehicle, wherein the light emits a color different from the color of light emitted by a second light mounted to the vehicle.

In some embodiments, the data was recorded by a device housed off the vehicle and communicated to the vehicle via a network.

In some embodiments, the calculating of the likelihood of unplanned disengagement of the DAS was executed by a processor housed off the vehicle and communicated to the vehicle via a network.

According to various embodiments of the disclosed technology, a system of alerting an occupant of a vehicle employing a DAS comprises a controller connected to a light mounted to the vehicle, a processor, and a memory coupled to the processor to store instructions. The instructions, when executed by the processor, cause the processor to perform operations, the operations comprising: receiving data relating to a future driving environment, calculating a likelihood of unplanned disengagement of the DAS based on the data, and alerting the occupant by modulating headlight characteristics, wherein the intensity of the modulation is proportional with the calculated likelihood of unplanned disengagement of the DAS.

In some embodiments, the modulation of headlight characteristics comprises: oscillating the luminosity of the light mounted to the vehicle at a first frequency in response to the calculated likelihood of unplanned disengagement of the DAS exceeding a first threshold value, and oscillating the luminosity of the light mounted to the vehicle at a second frequency in response to the calculated likelihood of unplanned disengagement of the DAS exceeding a second threshold value.

In some embodiments, the light mounted to the vehicle comprises a headlight housing, the headlight housing comprises a plurality of independently controlled light sources, and the modulation of headlight characteristics comprises altering the lighting characteristics of an independently controlled light sources within the plurality of independently controlled light sources.

In some embodiments, the light mounted to the vehicle comprises a headlight housing, the headlight housing comprises a plurality of independently controlled shutters, and the modulation of headlight characteristics comprises actuating an independently controlled shutter within the plurality of independently controlled light sources, wherein the actuating of the independently controlled shutter results in blocking of light emitted from a light source within the headlight housing.

In some embodiments, the modulation of headlight characteristics comprises rotating the light mounted to the vehicle along a horizontal plane in order to further indicate to the occupant that a source of the calculated likelihood of unplanned disengagement includes a change in road geometry.

In some embodiments, the modulation of headlight characteristics comprises rotating the light mounted to the vehicle along a vertical plane in order to further indicate to the occupant that a source of the calculated likelihood of unplanned disengagement includes a detected obstacle in the path of the vehicle.

In some embodiments, the system further comprises a second light mounted to the vehicle, wherein the modulation of headlight characteristics comprises activating the light mounted to the vehicle, wherein the light emits a color different from the color of light emitted by a second light mounted to the vehicle.

According to various embodiments of the disclosed technology, a non-transitory machine-readable medium having instructions stored therein, which when executed by a processor, cause the processor to perform operations, the operations comprising: receiving data relating to a future driving environment of a vehicle, calculating a likelihood of unplanned disengagement of a DAS based on the data, and alerting an occupant of the vehicle by modulating headlight characteristics, wherein the intensity of the modulation is proportional with the calculated likelihood of unplanned disengagement of the DAS.

In some embodiments, the modulation of headlight characteristics comprises oscillating the luminosity of a light mounted to the vehicle in response to the calculated likelihood of unplanned disengagement of the DAS exceeding a threshold value.

In some embodiments, the vehicle comprises a headlight housing, the headlight housing comprises a plurality of independently controlled light sources, and the modulation of headlight characteristics comprises altering the lighting characteristics of an independently controlled light sources within the plurality of independently controlled light sources.

In some embodiments, the vehicle comprises a headlight housing, the headlight housing comprises a plurality of independently controlled shutters, and the modulation of headlight characteristics comprises actuating an independently controlled shutter within the plurality of independently controlled light sources, wherein the actuating of the independently controlled shutter results in blocking of light emitted from a light source within the headlight housing.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIGS. 7A-C illustrate multiple scenarios in order to show how headlight characteristic modulation alerts may scale with increasing likelihood of unplanned disengagement.

FIGS. 8A-C illustrate multiple scenarios in order to show how the type of headlight characteristic modulation alerts may be tailored to specific sources of raised likelihood of unplanned disengagement.

Figure 1:
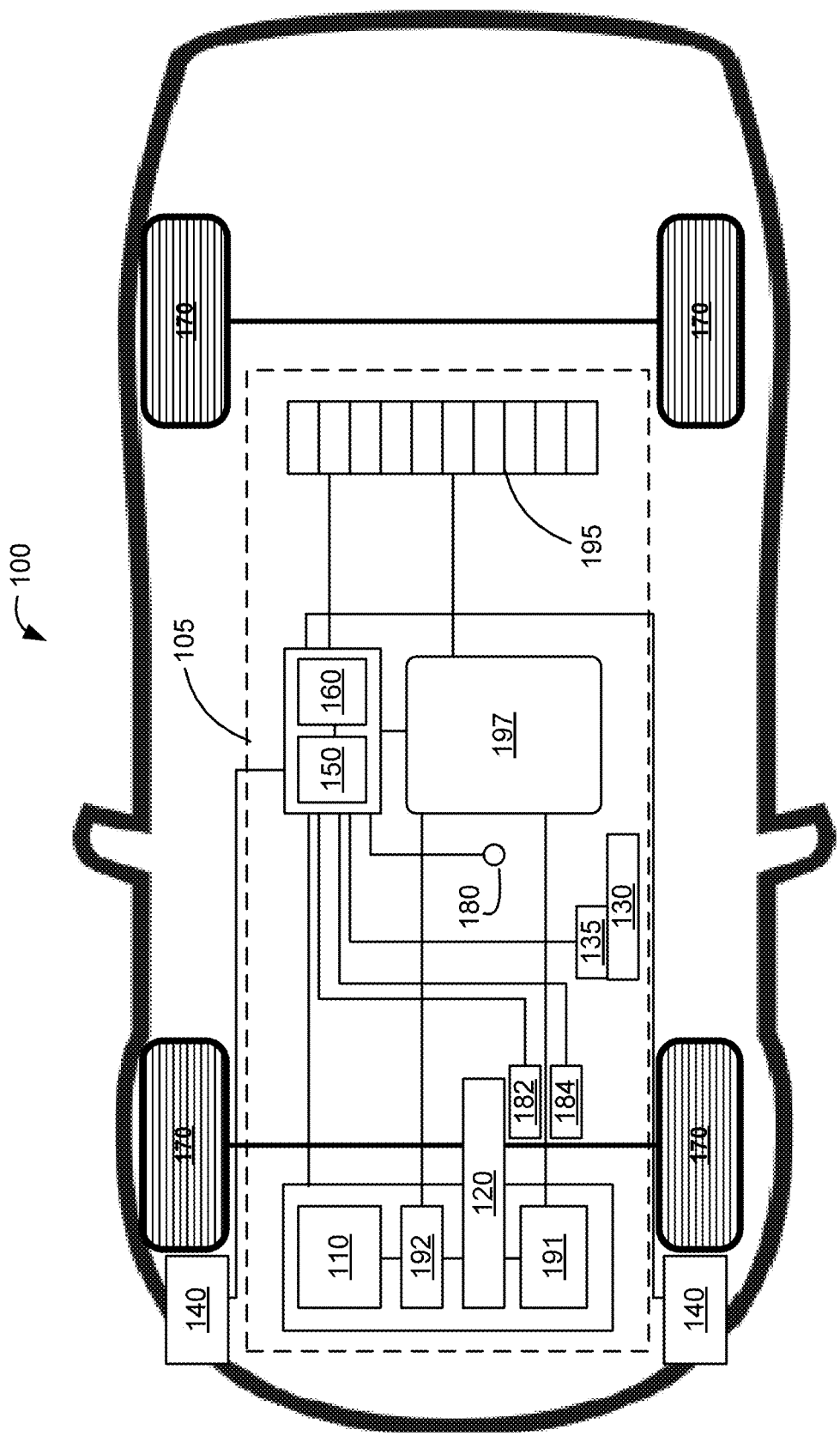
FIG. 1 illustrates an example hybrid electric vehicle in which various embodiments for autonomous vehicle/driving controls may be implemented.

The figures are not exhaustive and do not limit the present disclosure to the precise form disclosed.

DETAILED DESCRIPTION

DAS controlled vehicles are able to recognize upcoming dangers (e.g., sensor damage, sudden traffic, weather impediments) of which the DAS controls are too passive to navigate. In these conditions, the vehicle must lower its level of autonomous driving and relinquish driving roles to the occupant(s), even where the original driving plan had indicated that soon-to-be relinquished driving roles would remain with the DAS. Such disengagements are referred to herein as "unplanned disengagements." Where circumstances arise that force an unplanned disengagement, the occupant(s) must be prepared to assume driving roles substantially immediately. However, the occupant(s) often becomes increasingly inattentive as the DAS system assumes more driving roles. This phenomenon has led to a need for innovative ways to raise occupant awareness such that the DAS may relinquish driving roles to the occupant(s) safely.

While the embodiments disclosed herein may be thought of in the context of an event forcing the DAS to relinquish roles that may be traditionally categorized under L2, the disclosed systems and methods may be applied in any context where the occupant of the vehicle must assume driving roles.

Embodiments of the systems and methods disclosed herein may be configured to alert the occupant(s) of a vehicle of an unplanned disengagement through modulation of the shape, color, and/or intensity of area illuminated by the vehicle's headlights.

DAS can be used in a vehicle that at least, in part, controls or manages vehicle operation to provide varying levels of automated control or assistance. For ease of reference, the term "autonomous control" will be used herein to refer to such systems. In some vehicles, an override mechanism, such as an override switch, may be used to turn off or disengage a vehicle's autonomous control system. Such an override mechanism can allow the occupant(s) to assume manual control of a vehicle. However, when invoking conventional implementations of override mechanisms in a safety scenario (e.g., to avoid a collision), the occupant(s) still must engage in a human/manual situational assessment, and intervention/overriding autonomous control still involves human reaction time. To minimize the risk from errors that can occur during the human/manual situational assessment, based on data gathered from network services and from sensors both internal and external to the vehicle, the car may calculate a likelihood of unplanned disengagement and warn the occupant(s) of the need to be prepared to assume driving roles.

Accordingly, various embodiments are directed to warning the occupant(s) of a likelihood of unplanned disengagement and the implied need for driver preparedness. Disclosed methods to warn the driver include at least modulating the intensity of the vehicle's headlights, modulating the color of the vehicle's headlights, and/or modulating the shape of the area illuminated by the vehicle's headlights.

Modulation of the intensity of the vehicle's headlights and/or the shape of the area illuminated by the vehicle's headlights may provide a visual alert/indication/notification/flag to get the attention of the occupant(s) of upcoming (or downstream) situations. In some embodiments, the modulation includes brightening or dimming the headlights. In some embodiments, the modulation includes using actuators to rotate the headlights left or right, in turn altering the area illuminated by the vehicle's headlights to the left or right of a default position. In some embodiments, the modulation includes using actuators to rotate the headlights up or down, altering the area illuminated by the vehicle's headlights upwards or downwards from a default position. In some embodiments, the modulation includes activating a secondary light (e.g. high beams, fog lights, auxiliary lights), which shines light in an area previously not illuminated by the primary headlights. In some embodiments the modulation includes activating a secondary light which shines light in a color different from the color emitted by the primary headlights. In some embodiments, the modulation includes activating a secondary light which shines light with an intensity different from the intensity of light emitted by the primary headlights. In some embodiments, the modulation is enacted through a pattern of at least one pulse.

There are multiple benefits in warning the occupant(s) of a likelihood of unplanned disengagement through modulation of the vehicle's headlights. It is often observed that awareness of occupants decline with increasing reliance of DAS. For example, an occupant's mind may wander while providing oversight during their daily commute. In these situations, it is advantageous to provide a visual cue to the driver when they may have to quickly take on more driving roles. For example, one likelihood of unplanned disengagement can generate an urgent alert conveyed through a bright flashing red light, while, a lesser likelihood of unplanned disengagement can generate a less urgent alert conveyed through a slow pulse of blue light on the road. Furthermore, the vehicle may pan the direction of the headlights to illuminate and draw the occupant's attention to a source of the raised likelihood of unplanned disengagement. The combination of these attributes allow the occupant(s) to recognize the urgency of the alert and identify what must be done to address whatever is causing the DAS to disengage.

The systems and methods disclosed herein may process data from a variety of sources to calculate likelihood of unplanned disengagement. Sources of data may include sensors in the vehicle (e.g. wheel spin sensors, LIDAR sensors, clearance sensors, cameras), sensors in other vehicles, sensors on infrastructure (e.g. lane occupancy magnetometers, radar sensors), and databases (e.g. mapping databases, weather forecasts, traffic reports). In some embodiments, these sources of data may be delivered to processors via wired connections. In some embodiments, these sources of data may be delivered to processors wirelessly. In some embodiments, these sources of data may be delivered to processors over a network. The processors which calculate the likelihood of unplanned disengagement from the data may be present on the vehicle itself, or present elsewhere. The processors may calculate the likelihood of unplanned disengagement from the data and transmit the resulting likelihood of unplanned disengagement to the vehicle via a wired connection. In some embodiments, the resulting likelihood of unplanned disengagement is transmitted to the vehicle via a wireless connection. In some embodiments, the resulting likelihood of unplanned disengagement is transmitted to the vehicle over a network.

The systems and methods disclosed herein may be implemented with any of a number of different vehicles and vehicle types. For example, the systems and methods disclosed herein may be used with automobiles, trucks, motorcycles, recreational vehicles and other like on- or off-road vehicles. In addition, the principles disclosed herein may also extend to other vehicle types. An example hybrid electric vehicle (HEV) in which embodiments of the disclosed technology may be implemented is illustrated and described below as one example, but the hybrid electric nature of the vehicle is not necessary for the operation of the disclosed technology, nor is it limiting on the disclosed technology.

FIG. 1 illustrates an example hybrid electric vehicle (HEV) 100 in which various embodiments for driver disengagement of autonomous vehicle/driving controls may be implemented. It should be understood that various embodiments disclosed herein may be applicable to/used in various vehicles (internal combustion engine (ICE) vehicles, fully electric vehicles (EVs), etc.) that are fully or partially autonomously controlled/operated, not only HEVs.

HEV 100 can include drive force unit 105 and wheels 170. Drive force unit 105 may include an engine 110, motor generators (MGs) 191 and 192, a battery 195, an inverter 197, a brake pedal 130, a brake pedal sensor 135, a transmission 120, a memory 160, an electronic control unit (ECU) 150, a shifter 180, a speed sensor 182, and an accelerometer 184.

Engine 110 primarily drives the wheels 170. Engine 110 can be an ICE that combusts fuel, such as gasoline, ethanol, diesel, biofuel, or other types of fuels which are suitable for combustion. The torque output by engine 110 is received by the transmission 120. MGs 191 and 192 can also output torque to the transmission 120. Engine 110 and MGs 191 and 192 may be coupled through a planetary gear (not shown in FIG. 1B). The transmission 120 delivers an applied torque to the wheels 170. The torque output by engine 110 does not directly translate into the applied torque to the wheels 170.

MGs 191 and 192 can serve as motors which output torque in a drive mode, and can serve as generators to recharge the battery 195 in a regeneration mode (also referred to as regenerative braking). The electric power delivered from or to MGs 191 and 192 passes through inverter 197 to battery 195. Brake pedal sensor 135 can detect pressure applied to brake pedal 130, which may further affect the applied torque to wheels 170. Speed sensor 182 is connected to an output shaft of transmission 120 to detect a speed input which is converted into a vehicle speed by ECU 150. Accelerometer 184 is connected to the body of HEV 100 to detect the actual deceleration of HEV 100, which corresponds to a deceleration torque.

Transmission 120 is a transmission suitable for an HEV. For example, transmission 120 can be an electronically controlled continuously variable transmission (ECVT), which is coupled to engine 110 as well as to MGs 191 and 192. Transmission 120 can deliver torque output from a combination of engine 110 and MGs 191 and 192. The ECU 150 controls the transmission 120, utilizing data stored in memory 160 to determine the applied torque delivered to the wheels 170. For example, ECU 150 may determine that at a certain vehicle speed, engine 110 should provide a fraction of the applied torque to the wheels while MG 191 provides most of the applied torque. ECU 150 and transmission 120 can control an engine speed (NE) of engine 110 independently of the vehicle speed (V).

ECU 150 may include circuitry to control the above aspects of vehicle operation. ECU 150 may include, for example, a microcomputer that includes one or more processing units (e.g., microprocessors), memory storage (e.g., RAM, ROM, etc.), and I/O devices. ECU 150 may execute instructions stored in memory to control one or more electrical systems or subsystems in the vehicle. ECU 150 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., anti-lock braking system (ABS) or electronic stability control (ESC)), battery management systems, and so on. These various control units can be implemented using two or more separate electronic control units, or using a single electronic control unit.

MGs 191 and 192 each may be a permanent magnet type synchronous motor including for example, a rotor with a permanent magnet embedded therein. MGs 191 and 192 may each be driven by an inverter controlled by a control signal from ECU 150 so as to convert direct current (DC) power from battery 195 to alternating current (AC) power, and supply the AC power to MGs 191, 192. MG 192 may be driven by electric power generated by motor generator MG 191. It should be understood that in embodiments where MGs 191, 192 are DC motors, no inverter is required. The inverter, in conjunction with a converter assembly may also accept power from one or more of MGs 191, 192 (e.g., during engine charging), convert this power from AC back to DC, and use this power to charge battery 195 (hence the name, motor generator). ECU 150 may control the inverter, adjust driving current supplied to MG 192, and adjust the current received from MG 191 during regenerative coasting and braking.

Battery 195 may be implemented as one or more batteries or other power storage devices including, for example, lead-acid batteries, lithium ion, and nickel batteries, capacitive storage devices, and so on. Battery 195 may also be charged by one or more of MGs 191, 192, such as, for example, by regenerative braking or by coasting during which one or more of MGs 191, 192 operates as generator. Alternatively (or additionally), battery 195 can be charged by MG 191, for example, when HEV 100 is in idle (not moving/not in drive). Further still, battery 195 may be charged by a battery charger (not shown) that receives energy from engine 110. The battery charger may be switched or otherwise controlled to engage/disengage it with battery 195. For example, an alternator or generator may be coupled directly or indirectly to a drive shaft of engine 110 to generate an electrical current as a result of the operation of engine 110. Still other embodiments contemplate the use of one or more additional motor generators to power the rear wheels of a vehicle (e.g., in vehicles equipped with 4-Wheel Drive), or using two rear motor generators, each powering a rear wheel.

Battery 195 may also be used to power other electrical or electronic systems in the vehicle. Battery 195 can include, for example, one or more batteries, capacitive storage units, or other storage reservoirs suitable for storing electrical energy that can be used to power MG 191 and/or MG 192. When battery 195 is implemented using one or more batteries, the batteries can include, for example, nickel metal hydride batteries, lithium ion batteries, lead acid batteries, nickel cadmium batteries, lithium ion polymer batteries, and other types of batteries.

Outside of the drive force unit 105, but relevant to the disclosure herein is the headlight housing 140. A headlight housing may include for example, one or more headlights (e.g. halogen bulb, LED, HID bulbs), one or more secondary lights (e.g. high beams, fog lights, colored auxiliary lights), and one or more rotational motors (e.g. DC motor, RC servo motor, stepper motor). Headlights generally provide lighting of the area in front of the vehicle. Secondary lights may be provided for situations requiring specialized lighting characteristics, e.g. high beams to illuminate a long stretch of road, fog lights to illuminate the road immediately in front of the vehicle with a less distracting color in low visibility, auxiliary lights to provide an aesthetic appearance or indicate an action by the driver. Rotational motors may be mounted such that they may rotate an individual headlight or secondary light vertically or horizontally to change the direction that light is emitted. The components within headlight housing 140 are depicted herein being controlled and powered by the ECU 150 via a single bus. In some embodiments, the components within headlight housing 140 may instead be controlled and powered via separate lines. In some embodiments, the headlight housing 140 or elsewhere on the vehicle and/or lighting components that may normally be within the headlight housing 140 may instead be located outside the headlight housing 140.

Figure 2A:
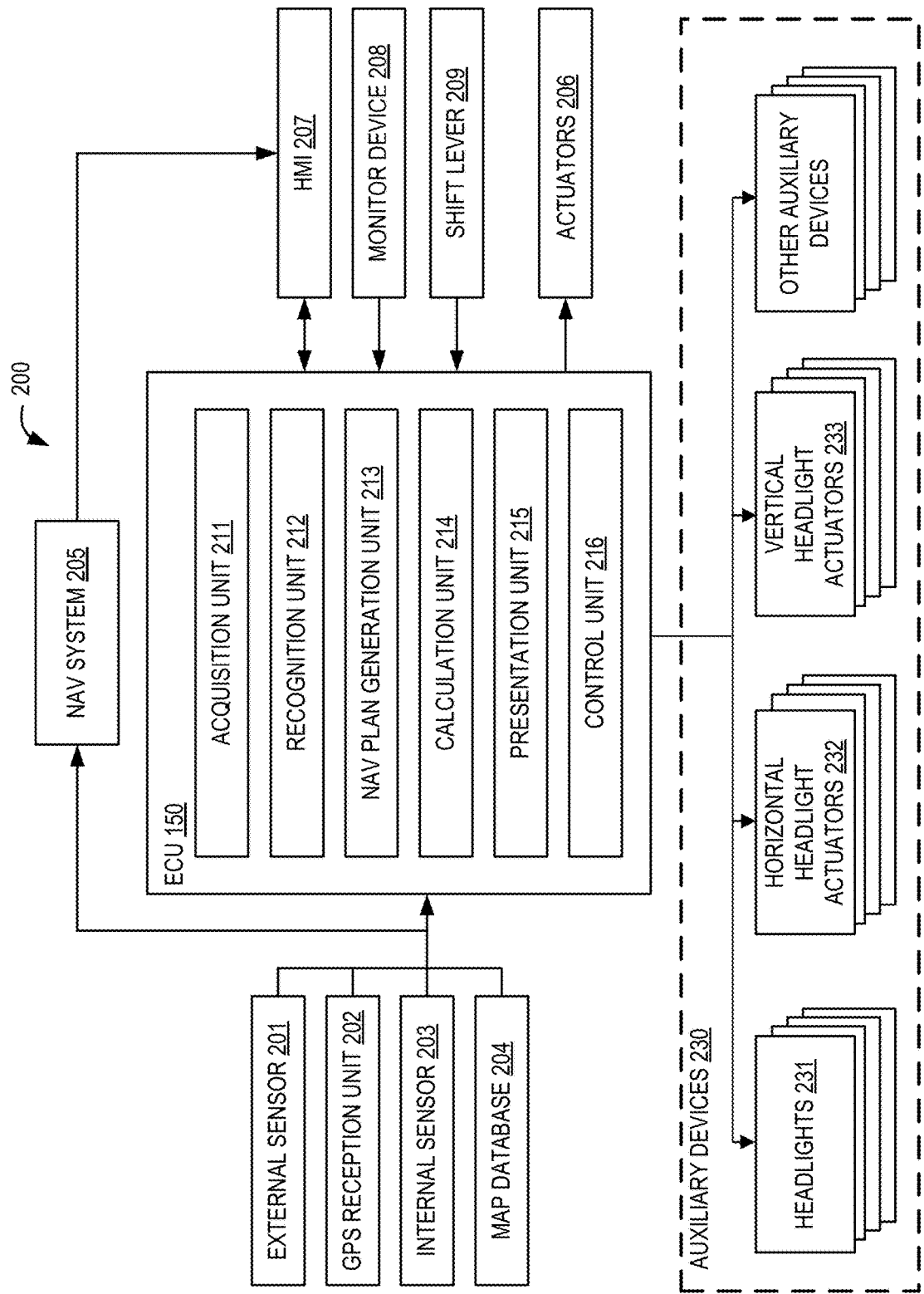
FIGS. 2A-B illustrate an example autonomous control system that may be used to autonomously control a vehicle.

FIG. 2A illustrates an example autonomous control system 200 that may be used to autonomously control a vehicle, e.g., HEV 100. Autonomous control system 200 may be installed in HEV 100, and executes autonomous control of HEV 100. As described herein, autonomous control can refer to control that executes driving/assistive driving operations such as acceleration, deceleration, and/or steering of a vehicle, general movement of the vehicle, without necessarily depending or relying on driving operations/directions by a driver or operator of the vehicle.

As an example, autonomous control may include lane keeping assist control where a steering wheel (not shown) is steered automatically (namely, without depending on a steering operation by the driver) such that HEV 100 does not depart from a running lane. That is, the steering wheel is automatically operated/controlled such that HEV 100 runs along the running lane, even when the driver does not perform any steering operation. As alluded to above, other autonomous control may include assistive driving mechanisms in the form of, e.g., visual or audible alerts or warnings, indirect haptic feedback, such as vibrating the driver's seat, etc.

As another example, autonomous control may include navigation control, where when there is no preceding vehicle in front of the HEV 100, constant speed (cruise) control is effectuated to make HEV 100 run at a determined constant speed. When there is a preceding vehicle in front of HEV 100, follow-up control is effectuated to adjust HEV 100's speed according to a distance between HEV 100 and the preceding vehicle.

In some scenarios, switching from autonomous control to manual driving may be executed. Whether or not to execute this switch from autonomous control to manual driving may be determined based on a comparison between a comparison target and a threshold. In one embodiment, the comparison target is quantified so as to be compared with the threshold. When the comparison target is equal to or more than the threshold, the autonomous control system 200 executes the switch from an autonomous control mode to a manual driving mode. In other situations/scenarios, autonomous control system 200 may take over operation, effecting a switch from manual driving/control to autonomous control. As will be discussed in greater detail below, autonomous control system 200 may make certain determinations regarding whether to comply or proceed with autonomous control based on a command from autonomous control system 200. For example, considerations regarding recoverability and vehicle control under certain conditions may be considered as factors in determining whether or not autonomous control can be safely executed. Such considerations may also be reflected as thresholds for comparison.

For example, when an operation amount of any of a steering operation, an acceleration operation, and brake operation by the driver of HEV 100 during the autonomous driving control becomes equal to or more than a threshold, autonomous control system 200 may execute a switch from autonomous control to manual control.

It should be understood that manual control or manual driving can refer to a vehicle operating status wherein a vehicle's operation is based mainly on driver-controlled operations/maneuvers. In a DAS context, driving operation support control can be performed during manual driving. For example, a driver may be actively performing any of a steering operation, an acceleration operation, and a brake operation of the vehicle, while autonomous control apparatus 200 performs some subset of one or more of those operations, e.g., in an assistive, complementary, or corrective manner. As another example, driving operation support control adds or subtracts an operation amount to or from the operation amount of the manual driving (steering, acceleration, or deceleration) that is performed by the driver. It should be understood that in such scenarios, use of influential control over a driver's steering hand(s), because a driver is already engaging in a "proper" operation, may enforce or positively reinforce the driver's action(s).

In the example shown in FIG. 2A, autonomous control system 200, external sensor 201, a GPS (Global Positioning System) reception unit 202, an internal sensor 203, a map database 204, a navigation system 205, actuators 206, an HMI (Human Machine Interface) 207, a monitor device 208, a shift lever 209, and auxiliary devices 230 are provided. Autonomous control system 200 may communicate with ECU 150, or in some embodiments may be implemented with its own ECU.

External sensor 201 is a detector that detects external circumstances such as surrounding information of HEV 100. The external sensor 201 may include at least one of a camera, a radar, and a Laser Imaging Detection and Ranging (LIDAR) unit.

The camera unit may be an imaging device that images the external circumstances surrounding the vehicle. For example, the camera is provided on a back side of a front windshield of the vehicle. The camera may be a monocular camera or a stereo camera. The camera outputs, to the ECU 150, image information on the external circumstances surrounding the vehicle. The camera is not limited to a visible light wavelength camera but can be an infrared camera.

The radar unit uses radio waves to detect obstacles outside of the vehicle by transmitting radio waves to the surroundings of the vehicle, and receiving reflected radio waves from an obstacle to detect the obstacle, distance to the obstacle or a relative positional direction of the obstacle. The radar unit outputs detected obstacle information to the ECU 150.

The LIDAR unit may operate similar to the manner in which the radar unit operates except that light is used in place of radio waves. The LIDAR unit outputs detected obstacle information to the ECU 150.

GPS reception unit 202 receives signals from three or more GPS satellites to obtain position information indicating a position of HEV 100. For example, the position information can include latitude information and longitude information. The GPS reception unit 202 outputs the measured position information of the vehicle to the ECU 150.

Internal sensor 203 is a detector for detecting information regarding, e.g., a running status of HEV 100, operational/operating conditions, e.g., amount of steering wheel actuation, rotation, angle, amount of acceleration, accelerator pedal depression, brake operation by the driver of HEV 100. The internal sensor 203 includes at least one of a vehicle speed sensor, an acceleration sensor, and a yaw rate sensor. Moreover, internal sensor 203 may include at least one of a steering sensor, an accelerator pedal sensor, and a brake pedal sensor.

A vehicle speed sensor is a detector that detects a speed of the HEV 100. In some embodiments, HEV 100's speed may be measured directly or through calculations/inference depending on the operating conditions/status of one or more other components of HEV 100. For example, a wheel speed sensor can be used as the vehicle speed sensor to detect a rotational speed of the wheel, which can be outputted to ECU 150.

The acceleration sensor can be a detector that detects an acceleration of the vehicle. For example, the acceleration sensor may include a longitudinal acceleration sensor for detecting a longitudinal acceleration of HEV 100, and a lateral acceleration sensor for detecting a lateral acceleration of HEV 100. The acceleration sensor outputs, to the ECU 150, acceleration information.

The yaw rate sensor can be a detector that detects a yaw rate (rotation angular velocity) around a vertical axis passing through the center of gravity of HEV 100. For example, a gyroscopic sensor is used as the yaw rate sensor. The yaw rate sensor outputs, to the ECU 150, yaw rate information including the yaw rate of HEV 100.

The steering sensor may be a detector that detects an amount of a steering operation/actuation with respect to a steering wheel 30 by the driver of HEV 100. The steering operation amount detected by the steering sensor may be a steering angle of the steering wheel or a steering torque applied to the steering wheel, for example. The steering sensor outputs, to the ECU 150, information including the steering angle of the steering wheel or the steering torque applied to the steering wheel of HEV 100.

The accelerator pedal sensor may be a detector that detects a stroke amount of an accelerator pedal, for example, a pedal position of the accelerator pedal with respect to a reference position. The reference position may be a fixed position or a variable position depending on a determined parameter. The accelerator pedal sensor is provided to a shaft portion of the accelerator pedal AP of the vehicle, for example. The accelerator pedal sensor outputs, to the ECU 150, operation information reflecting the stroke amount of the accelerator pedal.

The brake pedal sensor may be a detector that detects a stroke amount of a brake pedal, for example, a pedal position of the brake pedal with respect to a reference position. Like the accelerator position, a brake pedal reference position may be a fixed position or a variable position depending on a determined parameter. The brake pedal sensor may detect an operation force of the brake pedal (e.g. force on the brake pedal, oil pressure of a master cylinder, and so on). The brake pedal sensor outputs, to the ECU 150, operation information reflecting the stroke amount or the operation force of the brake pedal.

A map database 204 may be a database including map information. The map database 204 is implemented, for example, in a disk drive or other memory installed in HEV 100. The map information may include road position information, road shape information, intersection position information, and fork position information, for example. The road shape information may include information regarding a road type such as a curve and a straight line, and a curvature angle of the curve. When autonomous control system 200 uses a Simultaneous Localization and Mapping (SLAM) technology or position information of blocking structural objects such as buildings and walls, the map information may further include an output signal from external sensor 201. In some embodiments, map database 204 may be a remote data base or repository with which HEV 100 communicates.

Navigation system 205 may be a component or series of interoperating components that guides the driver of HEV 100 to a destination on a map designated by the driver of HEV 100. For example, navigation system 205 may calculate a route followed or to be followed by HEV 100, based on the position information of HEV 100 measured by GPS reception unit 202 and map information of map database 204. The route may indicate a running lane of a section(s) of roadway in which HEV 100 traverses, for example. Navigation system 205 calculates a target route from the current position of HEV 100 to the destination, and notifies the driver of the target route through a display, e.g., a display of a head unit, HMI 207 (described below), and/or via audio through a speaker(s) for example. The navigation system 205 outputs, to the ECU 150, information of the target route for HEV 100. In some embodiments, navigation system 205 may use information stored in a remote database, like map database 204, and/or some information processing center with which HEV 100 can communicate. A part of the processing executed by the navigation system 205 may be executed remotely as well.

Actuators 206 may be devices that execute running controls of HEV 100. The actuators 206 may include, for example, a throttle actuator, a brake actuator, and a steering actuator. For example, the throttle actuator controls, in accordance with a control signal output from the ECU 150, an amount by which to open the throttle of HEV 100 to control a driving force (the engine) of HEV 100. In another example, actuators 206 may include one or more of MGs 191 and 192, where a control signal is supplied from the ECU 150 to MGs 191 and/or 192 to output motive force/energy. The brake actuator controls, in accordance with a control signal output from the ECU 150, the amount of braking force to be applied to each wheel of the vehicle, for example, by a hydraulic brake system. The steering actuator controls, in accordance with a control signal output from the ECU 150, driving an assist motor of an electric power steering system that controls steering torque.

HMI 207 may be an interface used for communicating information between a passenger(s) (including the operator) of HEV 100 and autonomous control system 200. For example, the HMI 207 may include a display panel for displaying image information for the passenger(s), a speaker for outputting audio information, and actuation mechanisms, such as buttons or a touch panel used by the occupant for performing an input operation. HMI 207 may also or alternatively transmit the information to the passenger(s) through a mobile information terminal connected wirelessly and receive the input operation by the passenger(s) through the mobile information terminal.

Monitor device 208 monitors a status of the driver/operator. The monitor device 208 can check a manual driving preparation state of the driver. More specifically, the monitor device 208 can check, for example, whether or not the driver is ready to start manual operation of HEV 100. Moreover, the monitor device 208 can check, for example, whether or not the driver has some intention of switching HEV 100 to a manual mode of operation.

For example, the monitor device 208 may be a camera that can take an image of the driver, where the image can be used for estimating the degree to which the driver's eyes are open, the direction of the driver's gaze, whether or not the driver is holding the steering wheel, etc. Monitor device 208 may also be a pressure sensor for detecting the amount of pressure the driver's hand(s) are applying to the steering wheel. As another example, the monitor device 208 can be a camera that takes an image of a hand of the driver.

A shift lever 209 can be positioned at a shift position, e.g., "A (AUTOMATIC)," "D (DRIVE)," etc. The shift position "A" indicates, for example, an automatic engage mode where autonomous control is engaged automatically. The shift position "D" indicates a triggered engage mode where autonomous control is engaged in response to a driver-initiated request to operate HEV 100 in an autonomous driving mode.

ECU 150 may execute autonomous control of the vehicle, and may include an acquisition unit 211, a recognition unit 212, a navigation plan generation unit 213, a calculation unit 214, a presentation unit 215, and a control unit 216.

Acquisition unit 211 may obtain the following operation amounts or levels of actuation based on the information obtained by the internal sensor 203: steering operation, acceleration operation, and brake operation by the driver during an autonomous control mode; and the level of steering operation, acceleration operation, and brake operation by the driver of the vehicle during a manual control mode.

Recognition unit 212 may recognize or assess the environment surrounding or neighboring HEV 100 based on the information obtained by the external sensor 201, the GPS reception unit 202, and/or the map database 204. For example, the recognition unit 212 includes an obstacle recognition unit (not shown), a road width recognition unit (not shown), and a facility recognition unit (not shown). The obstacle recognition unit recognizes, based on the information obtained by the external sensor 201, obstacles surrounding the vehicle. For example, the obstacles recognized by the obstacle recognition unit include moving objects such as pedestrians, other vehicles, motorcycles, and bicycles and stationary objects such as a road lane boundary (white line, yellow line), a curb, a guard rail, poles, a median strip, buildings and trees. The obstacle recognition unit obtains information regarding a distance between the obstacle and the vehicle, a position of the obstacle, a direction, a relative velocity, a relative acceleration of the obstacle with respect to the vehicle, and a category and attribution of the obstacle. The category of the obstacle includes a pedestrian, another vehicle, a moving object, and a stationary object. The attribution of the obstacle can refer to a property of the obstacle such as hardness and a shape of the obstacle.

The road width recognition unit recognizes, based on the information obtained by the external sensor 201, the GPS reception unit 202, and/or the map database 204, a road width of a road in which the vehicle is running.

The facility recognition unit recognizes, based on the map information obtained from the map database 204 and/or the vehicle position information obtained by the GPS reception unit 202, whether or not HEV 100 is operating/being driven through an intersection, in a parking structure, etc. The facility recognition unit may recognize, based on the map information and the vehicle position information, whether or not the vehicle is running in a school zone, near a childcare facility, near a school, or near a park, etc.

Navigation plan generation unit 213 may generate a navigation plan for HEV 100 based on the target route calculated by the navigation system 205, the information on obstacles surrounding HEV 100 recognized by recognition unit 212, and/or the map information obtained from map database 204. The navigation plan may reflect one or more operating conditions/controls to effectuate the target route. For example, the navigation plan can include a target speed, a target acceleration, a target deceleration, a target direction, and/or a target steering angle with which HEV 100 should be operated at any point(s) along the target route so that the target route can be achieved to reach a desired destination. It should be understood that navigation plan generation unit 213 generates the navigation plan such that HEV 100 operates along the target route while satisfying one or more criteria and/or constraints, including, for example, safety constraints, legal compliance rules, operating (fuel/energy) efficiency, and the like. Moreover, based on the existence of obstacles surrounding HEV 100, the navigation plan generation unit 213 generates the navigation plan for the vehicle so as to avoid contact with such obstacles.

Calculation unit 214 may calculate a threshold used for determining whether or not to switch from autonomous control to manual driving or vice versa. The determination can be performed based on the operating levels associated with the manner in which the driver is operating HEV 100 during autonomous control which is obtained by the acquisition unit 211. For example, the driver of HEV 100 may suddenly grasp the steering wheel (which can be sensed by internal sensor 203) and stomp on the brake pedal (which can be sensed by monitor device 208). The pressure on the steering wheel and the level of actuation of the brake pedal may be excessive enough (exceed a threshold) suggesting that the driver intends to override the autonomous control system 200.

Presentation unit 215 displays, on a display of the HMI 207, a threshold which is calculated by the calculation unit 214 and used for determining whether or not to execute the switching from autonomous control to the manual driving or vice versa.

Control unit 216 can autonomously control HEV 100 based on the navigation plan generated by navigation plan generation unit 213. The control unit 216 outputs, to the actuators 206, control signals according to the navigation plan. That is, the control unit 216 controls actuators 206 based on the navigation plan, and thereby autonomous control of HEV 100 is executed/achieved. Moreover, certain levels of operation, e.g., steering wheel actuation, by the driver can be detected by the acquisition unit 211. When such level(s) equal or exceed the threshold calculated by the calculation unit 214 in a period during which autonomous control is being used to operate HEV 100, control unit 216 executes a switching from autonomous control to manual control.

Auxiliary devices 230 may include devices that can be operated by the driver of the vehicle, but are not necessarily drive-related, such as actuators 206. The Auxiliary devices 230 may also be operated by control signals from the control unit 216, or from the ECU 150 generally. Most relevant to this disclosure, auxiliary devices 230 may include headlights 231, horizontal headlight actuators 232, and vertical headlight actuators 233. In addition, the collection of auxiliary devices 230 may include other auxiliary devices (e.g. a direction indicator, a windshield wiper, a seat warmer).

Headlights 231 may illuminate, in accordance with a control and/or power signal output from the ECU 150, the road and/or surrounding environment. As discussed above in relation to headlight housing 140 from FIG. 1, in some embodiments, headlights 231 may include one or more headlights (e.g. halogen bulb, LED, HID bulbs), and/or one or more secondary lights (e.g. high beams, fog lights, colored auxiliary lights). In some embodiments, one or more of headlights 231 may provide for situations requiring specialized lighting characteristics (e.g. high beams to illuminate a long stretch of road, fog lights to illuminate the road immediately in front of the vehicle with a less distracting color, auxiliary lights to provide an aesthetic appearance or indicate an action by the driver.)

In some embodiments, horizontal headlight actuators 232 control, in accordance with a control signal output from the ECU 150, the direction that one or more headlights 231 point along the horizontal plane. This may be done, for example, by operating a rotational motor (e.g. a DC Motor, RC Servo motor, Stepper motor) that is mounted to one or more headlights 231 such that turning the rotational motor's shaft rotates one or more headlights 231 horizontally.

In some embodiments, vertical headlight actuators 233 control, in accordance with a control signal output from the ECU 150, the direction that one or more headlights 231 point along the plane perpendicular to the road and parallel to the front-rear axis of the vehicle. This may be done, for example, by operating a rotational motor that is mounted to one or more headlights 231 such that turning the rotational motor's shaft rotates one or more headlights vertically.

Figure 2B:
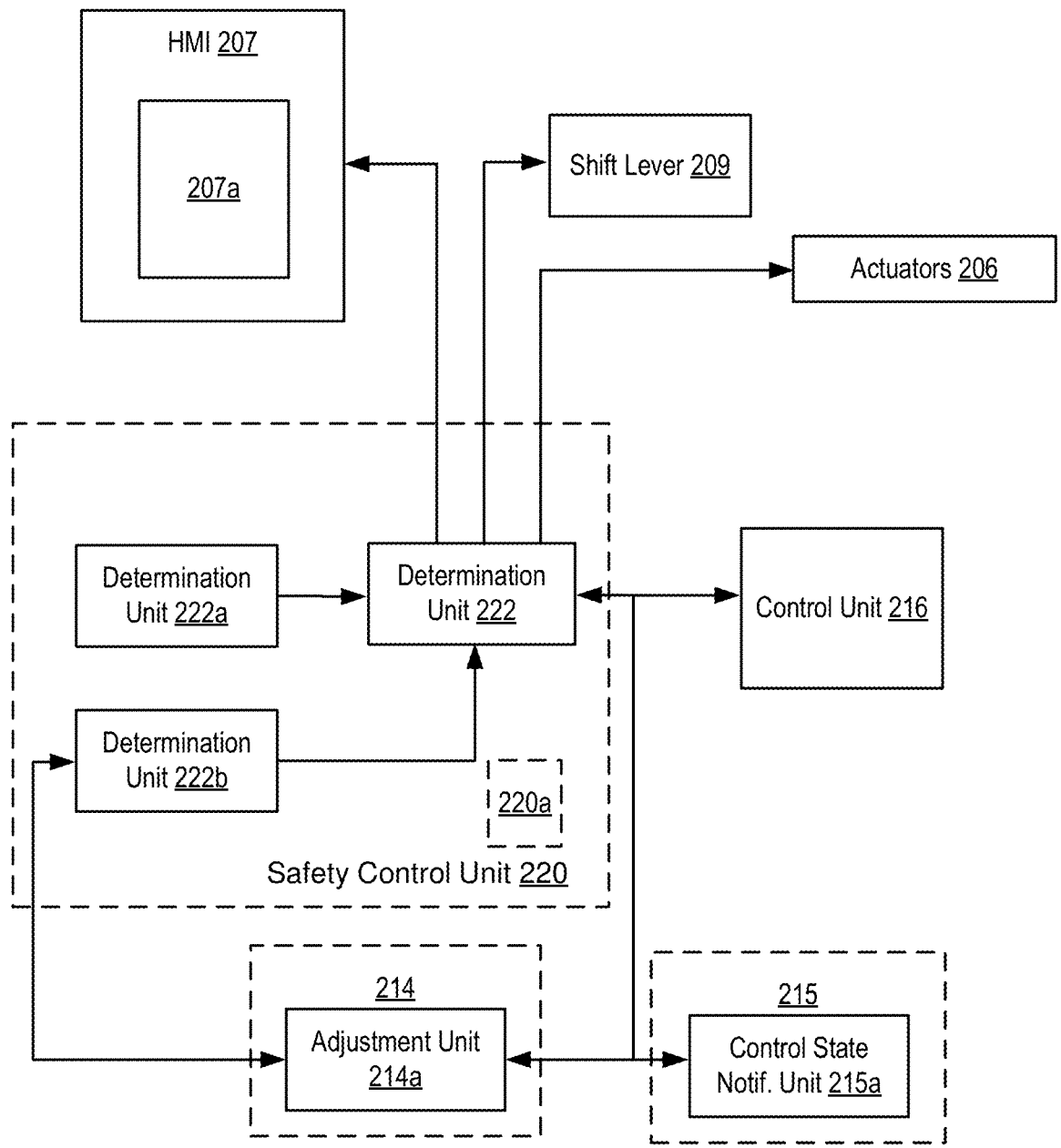

Referring to FIG. 2B, control unit 216 operatively interacts with safety control unit 220 that determines whether or not autonomous control system 200 (in particular, control unit 216) can engage (e.g., activate, start) in autonomous control of HEV 100. For example, safety control unit 220 may include one or more determination units, e.g., determination unit 222a determines whether or not autonomous control can be engaged, based on a difference between a vehicle position calculated from signals received by the GPS reception unit 202 and an actual vehicle position calculated based on an output signal from the external sensor 201, the map information of the map database 204 and so forth. For example, a threshold condition associated with engagement of autonomous control in HEV 100 may be predicated on travel along a certain type of roadway, e.g., known segment (s) of road within map database 204, such as a freeway (versus) country lane. Road curvature may be another condition/characteristic on which autonomous control of HEV 100 may be based. Determination unit 222a may make its determination based on one or more determinative factors.

Control unit 216 may further interact with a determination unit 222b of safety control unit 220 that determines whether or not a trigger to deactivate (stop) an autonomous control mode exists. For example, determination unit 222b can determine whether or not to execute the switch from the autonomous control to manual control based on the level of steering wheel actuation, brake pedal actuation, etc. effectuated by the driver while HEV 100 is being operated in an autonomous control mode, which is obtained by the acquisition unit 211. Other determinative factors or considerations may be the amount of acceleration or deceleration experienced by HEV 100, also determined by acquisition unit 211. When determination unit 222 determines that the autonomous control can be engaged, based on the determinations performed by determination units 222a and/or 222b, control unit 216 engages autonomous control of HEV 100. That is, determination unit 222 may act as a determination aggregator that aggregates determinations rendered by other determination units. Determination unit 222 may be a circuit, e.g., application-specific integrated circuit, logic, software, or some combination thereof that processes the individual determinations rendered by the other determination units (e.g., determination units 222a and 222b) to render an overall determination. That overall determination may control operation of control unit 216, e.g., to disengage autonomous control and switch to manual control or engage in autonomous control.

On the other hand, when determination units 222a and/or 222b determine that a switch from autonomous control to the manual control should be executed, autonomous control is deactivated/disengaged by control unit 216 or control unit 216 is itself deactivated/disengaged, and the driver proceeds to manually control HEV 100. It should be understood that other determination units may be used (or only a single determination unit may be used). In the case of multiple determination units being used, in some embodiments, any single determination that manual control should be executed can serve as a trigger to deactivate autonomous control. In some embodiments, presentation unit 215 is provided with a control state notification unit 215a that notifies the driver of a fact that HEV 100 is operating under autonomous control is in execution, and so forth. Such a notification may be displayed on a display of HMI 207, for example. Likewise, If a switch from autonomous control to the manual control is executed, the control state notification unit 215a displays, on the display of HMI 207 a corresponding notification.

HMI 207, in some embodiments, may include an autonomous control engagement trigger input unit 207a that can be actuated by the driver of HEV 100 to engage in an autonomous control mode (after safety control unit 220 determines that autonomous control can be effectuated).

In some embodiments, the driver of HEV 100 may be able to select an automatic autonomous control engage mode, where autonomous control unit 216 can be automatically engaged when safety control unit 220 determines that the autonomous control can be engaged. In some embodiments, shift lever 209 may be used to set a triggered autonomous control mode and an automatic engage mode (as alluded to above by actuating shift lever 209 to an "A" (AUTOMATIC) position or to a "D" (DRIVE) position.

Figure 3:
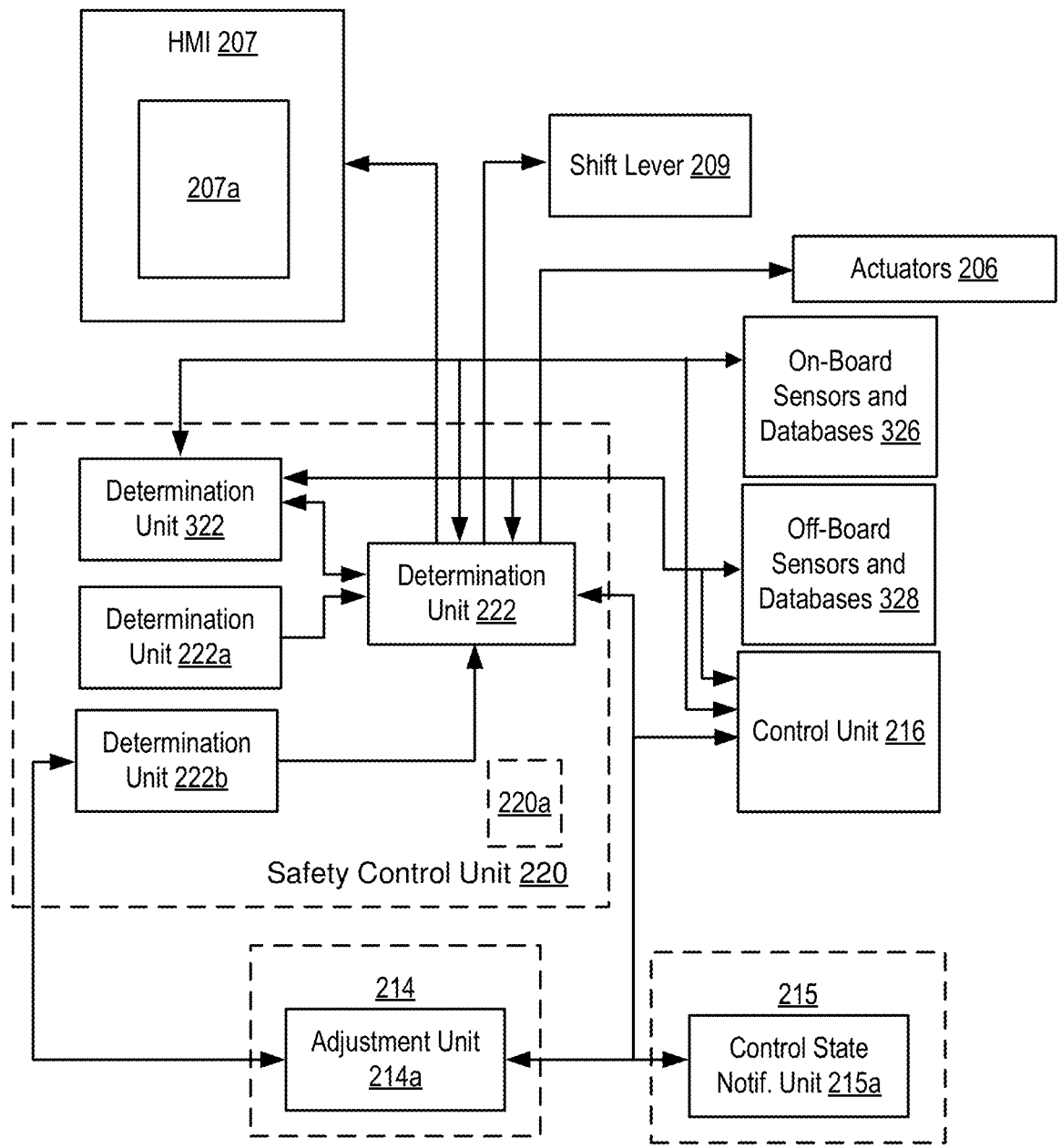
FIG. 3 illustrates one example implementation of a system which alerts vehicle occupants of a likelihood of unplanned disengagement of DAS.

As alluded to above, a modulation of various headlight characteristics may be triggered in order to warn the occupant(s) of HEV 100 that circumstances have raised the likelihood of an unplanned disengagement of autonomous control system 200. FIG. 3 illustrates an example implementation a system which generates alerts regarding the likelihood of unplanned disengagement. That is, in addition to the above-described components and functionality of autonomous control system 200, FIG. 3 illustrates on-board sensors and databases 326 and off-board sensors and databases 328 that are connected to determination unit 322, which in turn is connected to determining unit 222.

Figure 4:
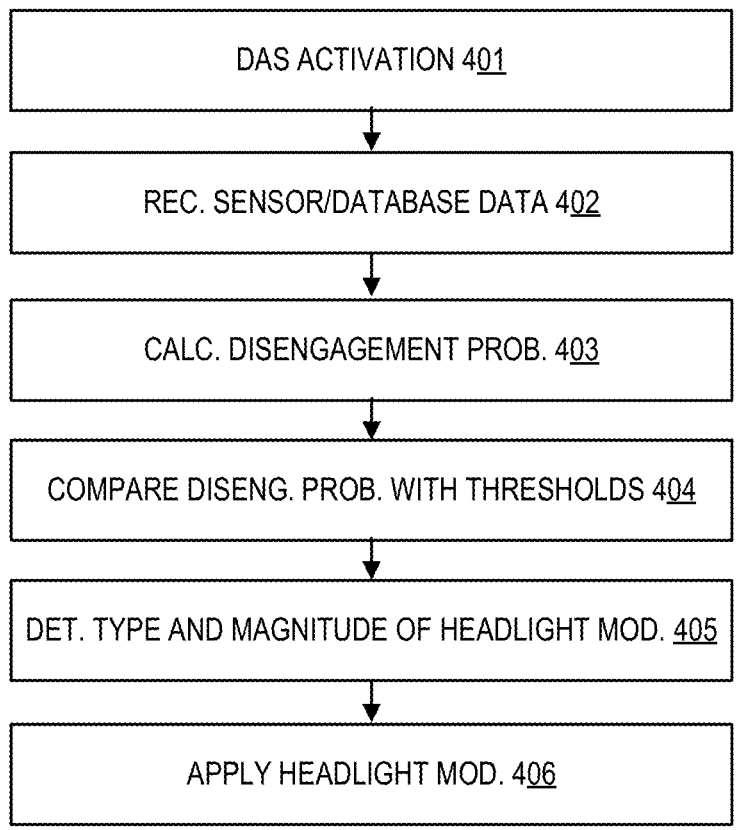
FIG. 4 illustrates one example method which alerts vehicle occupants of a likelihood of unplanned disengagement of DAS by way of modulation of headlight characteristics.

Determination unit 322, like the other determination units 222, 222a, and/or 222b, may comprise logic, circuitry, software, or some combination thereof to determine when an alert relating to a likelihood of unplanned disengagement should be raised. FIG. 4 is a flow chart illustrating one embodiment of a likelihood of unplanned disengagement alert method, e.g. a method of determining when an alert relating to a likelihood of unplanned disengagement should be raised, and effectuating that alert by modulating headlight characteristics. The following disclosure is made in reference to both FIG. 3 and FIG. 4 in order to facilitate an easier understanding of how signals may be handled by the components of the likelihood of unplanned disengagement alert system at each step in one embodiment of a likelihood of unplanned disengagement alert method.

As an initial consideration, in some embodiments, determination unit 322 does not proceed unless DAS has been activated. This functionality is enacted by determination unit 322 reading signals sent from control unit 216 to see if control unit 216 is commanding movement of HEV 100. For example, determination unit 322 may be embedded with instructions that upon receiving a signal or notification of control unit 216 engaging in DAS, will go into an active wait state wherein the alerting system methods may proceed. Once determination unit 322 has entered an active wait state, the likelihood of unplanned disengagement alert system has reached DAS activation 401 step in the disclosed likelihood of unplanned disengagement alert method. Upon receipt of a signal or notification of control unit 216 discontinuing DAS movement of HEV 100, determination unit 322 will go into an inactive wait state and wait until receipt of another signal or notification of DAS reengagement.

Once in step 401, determination unit 322 accepts data from on-board sensors and databases 326 and off-board sensors and databases 328. On-board sensors and databases 326 includes any sensors or database housed on the vehicle. On-board sensors and databases 326 may include, but is not limited to, any of the previously discussed internal sensors 201, GPS reception unit 202, internal sensor 203, and map database 204. Off-board sensors and databases 328 may include any sensor or database not housed on the vehicle, with the associated data communicated to components of safety control unit 220 and/or control unit 216 via wired or wireless connections. In some embodiments one or more off-board sensors and databases 328 may communicate their data to components of safety control unit 220 and/or control unit 216 via a network connection. Off-board sensors and databases 328 may include, but is not limited to, sensors and databases analogous to the on-board sensors and databases 326, but housed on a different vehicle. Off-board sensors and databases 328 may also include sensors and databases connected to a server, (e.g. a weather reporting service, a traffic reporting service, a global positioning service, a cloud data storage service), as well as sensors and databases connected to infrastructure (e.g. a radar device on a speed sign or a red-light camera on a traffic light). Upon receipt of data from the on-board sensors and databases 326 and/or the off-board sensors and databases 328, the determination unit has completed step 402.

At step 403, determination unit 322, uses the received data to calculate the likelihood of unplanned disengagement. In many embodiments, the likelihood of unplanned disengagement formula is a pre-coded formula, wherein the formula is regulated by the manufacturer through vehicle system update. In other embodiments, a driver selected formula is used, where the driver selects the priority of numerous data characteristics (e.g., driver can select certain conditions, such as upcoming road hazard, as a high priority, which implies that an upcoming road hazard will result in heightened likelihood of unplanned disengagement). The formula may also contain factory pre-programmed variables that cannot be altered by the driver. For instance, the driver may be incapable of changing the value for tire system faults. In some embodiments, the vehicle is coded with artificial intelligence, where the determination unit 322, by training itself, can improve the accuracy of its formulae for calculating unplanned disengagement probabilities. In some embodiments, the training is carried out by measuring inaccuracy based on explicit driver feedback (through driver interface) or through actual occurrences of unplanned DAS disengagement not matching with calculated unplanned disengagement probabilities.

In some embodiments, after the likelihood of unplanned disengagement has been calculated, the determination unit 322 sends the calculated likelihood of unplanned disengagement to determination unit 222 and continues on to step 404. Meanwhile, determination unit 222 checks to determine if DAS was deactivated. More specifically, the determination unit 222 awaits DAS deactivation, reported through control unit 216. Whether an unplanned DAS disengagement actually followed the reported likelihood of unplanned disengagement is saved as feedback data on a database. This database may be present in on-board sensors and databases 326 or in off-board sensors and databases 328. This feedback data may be referenced in later iterations of the likelihood of unplanned disengagement alert method to measure the accuracy of likelihood of unplanned disengagement calculation formulae.

After calculating a likelihood of unplanned disengagement, determination unit 322 will compare the calculated likelihood of unplanned disengagement with a threshold value, reference step 404. The threshold value may be assigned by the manufacturer. In some embodiments, the driver is able to lower the threshold value, thereby increasing the likelihood for headlight characteristic modulation. In some embodiments, any indication of fault from sensor or vehicle system would result in triggering any threshold value. In these embodiments, the sensor or system fault may override the need for calculating the likelihood of unplanned disengagement and proceed to step 405. In some embodiments, whether the threshold value is reached is based on cumulative likelihood of unplanned disengagement. In other embodiments, specific data types may automatically meet one or more thresholds. An example case is where traffic reporting service reports an upcoming accident, which automatically results in a probability value above the threshold value.

The calculated likelihood of unplanned disengagement is next used to calculate the type and magnitude of headlight characteristic modulation at step 405. In some embodiments, a greater likelihood of unplanned disengagement corresponds to a more pronounced and unmissable headlight characteristic modulation. For instance, the sudden detection of an obstacle in the road may result in a likelihood of unplanned disengagement calculation high enough to call for quickly flashing red lights, while the detection of a light rain miles down the road may result in a likelihood of unplanned disengagement calculation low enough to call for a smooth and slow panning of the headlights up and down. In some embodiments, various scenarios are assigned specific headlight characteristic modulations. For instance, the headlights may pan left and then back to their original position in quick succession where a curve in the road is a majority factor the calculated likelihood of unplanned disengagement. In some embodiments, the driver may assign specific headlight characteristic modulations to various scenarios.

After determining what type and magnitude of headlight characteristic modulation, determination unit 322 advances to step 406, wherein instructions to carry out the determined headlight characteristic modulation are applied to the intended auxiliary devices 230.

In some embodiments, the determined headlight characteristic modulation is applied by determination unit 322 sending the determined headlight characteristic modulation to determination unit 222 wherein determination unit 222 factors in outputs from determination units 222*a-b* and safety concerns before deciding to pass the instructions on to control unit 216. Determination unit 222 may account for safety concerns by, for instance, checking on-board sensors and databases 326, off-board sensors and databases 328, for indications of oncoming traffic that may be dazzled by the determined headlight characteristic modulation. Control unit 216 then converts the instructions into outputs signals to the headlights 231, horizontal headlight actuators 232, and vertical headlight actuators. The signals output to the headlights 231, horizontal headlight actuators 232, and vertical headlight actuators cause the associated devices to apply the determined headlight characteristic modulation and warn the occupant of the associated likelihood of unplanned disengagement scenario.

Figure 5:
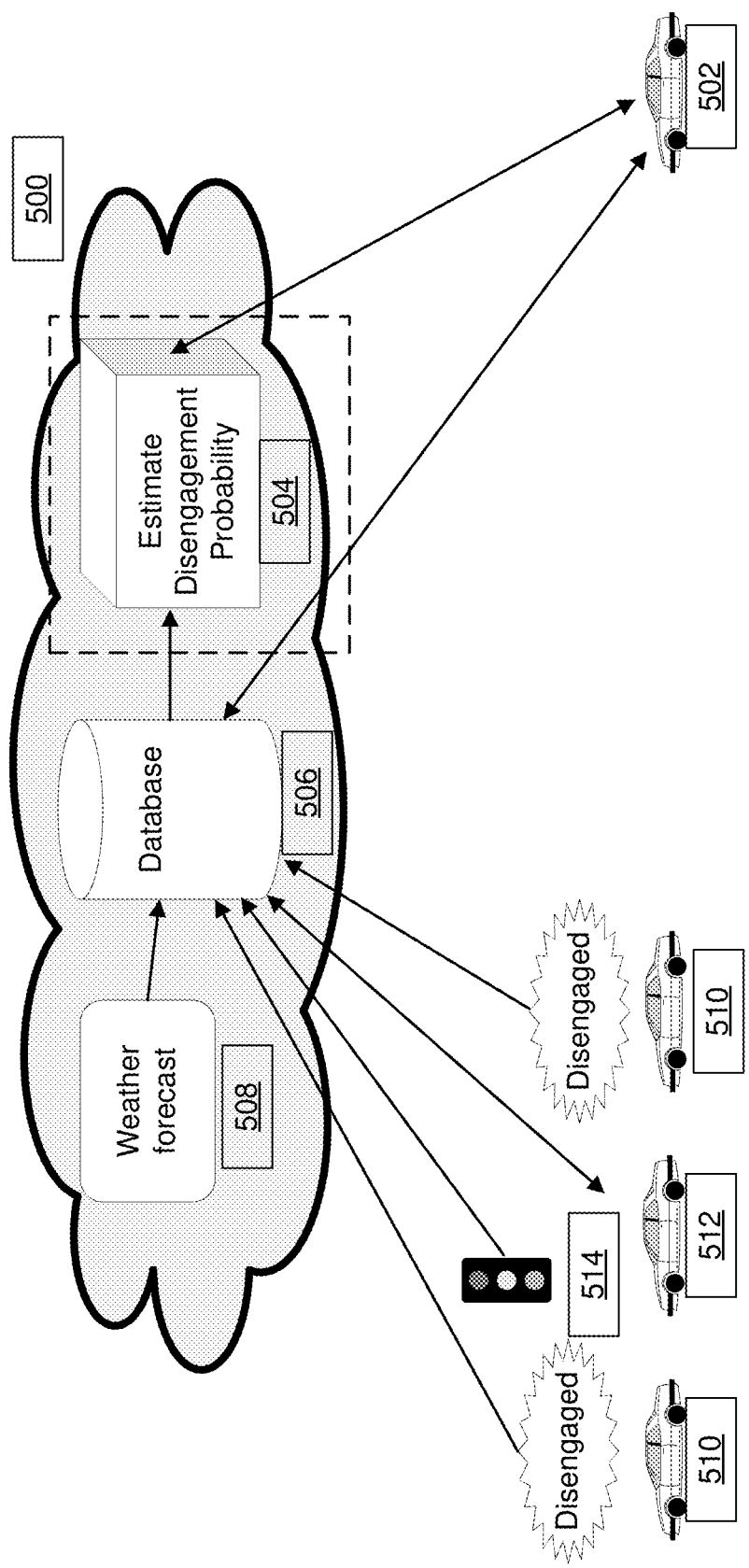
FIG. 5 illustrates an example network that may be formed by the utilization of the disclosed likelihood of unplanned disengagement alert systems and methods.

FIG. 5 illustrates an example network that may be formed by the utilization of the disclosed likelihood of unplanned disengagement alert systems and methods. In one embodiment, subject vehicle (referring to vehicle 502), will send a signal of DAS activation to network cloud 500. After which, network cloud 500 gathers relevant data from database 506 and returns the relevant data to subject vehicle 502. Database 506 stores information relevant to subject vehicle 502, which may include a weather forecast 508 taken from the internet (not shown), disengagement activities of upcoming vehicles 510, lack of unplanned disengagement activity of upcoming vehicles 512, or various traffic sensors 514. Subject vehicle 502 then calculates its likelihood of unplanned disengagement using its on-board systems. In other embodiments, network cloud 500 will estimate likelihood of unplanned disengagement 504 for subject vehicle 502 and the likelihood of unplanned disengagement is transmitted to subject vehicle 502. In some embodiments, the type and magnitude of headlight characteristic modulation is calculated within the cloud 500 and transmitted to subject vehicle 502.

Figure 6:
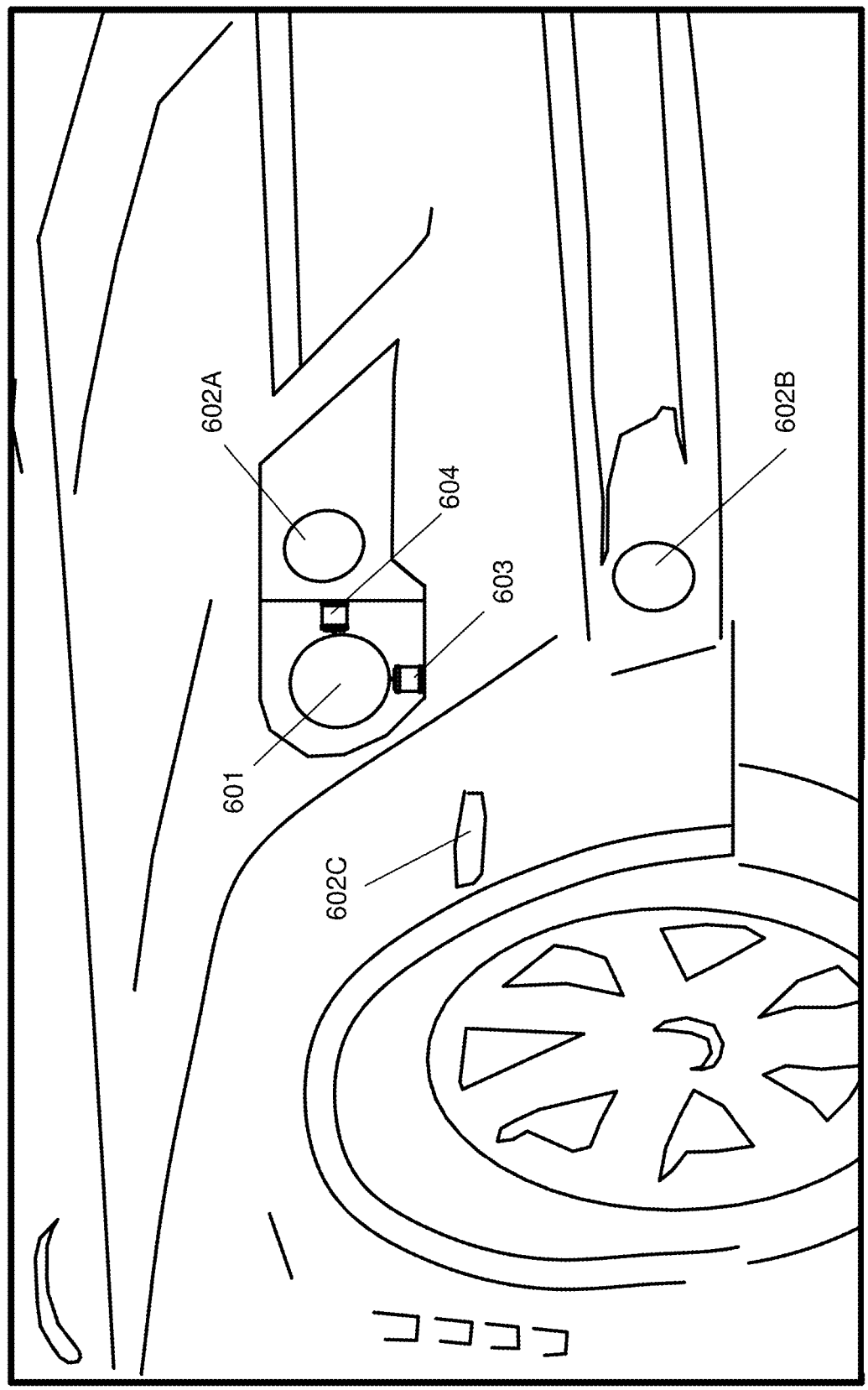
FIG. 6 illustrates one embodiment of how headlights, secondary lights, and rotational motors may be structurally combined to provide for modulation of headlight characteristics.

FIG. 6 illustrates one embodiment of how headlights, secondary lights, and rotational motors may be combined to provide for modulation of headlight characteristics. Primary headlight 601 illuminates the road and/or surrounding environment and may include any type of light (e.g. halogen bulb, LED, HID). Secondary lights 604 includes one or more secondary lights (e.g. high beams, fog lights, colored auxiliary lights), and may include any type of light.).

Generically, a secondary light may be located anywhere on the vehicle and may emit any color of light. In the depicted embodiment, secondary lights 602A-C may be provided for situations requiring specialized lighting characteristics. For instance, secondary light 602A may comprise high beam lightbulbs, wherein the high beam lightbulb is manufactured to output a light brighter than the primary headlight 601. Secondary light 602A may be, but is not required to be, used to illuminate a long stretch of road when oncoming traffic is light. Secondary light 602B may comprise fog light lightbulbs, wherein the fog light lightbulb is manufactured to output a light in a less distracting color. Secondary light 602B may be, but is not required to be, used to illuminate the road immediately in front of the vehicle with a less distracting color in low visibility situations. Secondary light 602C may comprise auxiliary lights, wherein the auxiliary lights are manufactured to shine light in distinctive colors. Secondary light 602C may be, but is not required to be, used to illuminate areas away from the front of the vehicle, provide an aesthetic appearance, or indicate to external audiences that the driver is taking a given action.

As discussed above regarding headlight housing 140, rotational motors may be mounted to a headlight 601 and/or a secondary light, such that operation of the rotational motors pans the attached light left-right, up-down, or along any axis. In the embodiment depicted in FIG. 6, horizontal rotational motor 603 is mounted to the surrounding structure, and the shaft of horizontal rotational motor 603 is attached to the bottom of primary headlight 601, such that operation of the rotational motor 603 turns the direction pointed by primary headlight 601 left or right versus a default position pointing in line with the road. Vertical rotational motor 604 is mounted to the surrounding structure, and the shaft of vertical rotational motor 604 is attached to the right side of primary headlight 601, such that operation of the rotational motor 604 turns the direction pointed by primary headlight 601 up or down versus a default position pointing in line with the road. Horizontal rotational motor 603 and vertical rotational motor 604 may be any type of rotational motors (e.g. DC motor, RC servo motor, stepper motor). In other embodiments, the same turning functionality may be implemented by other actuator systems (e.g. linear actuators, piezoelectric materials, hydraulic pumps) which impart forces or torques on the headlight 601 and/or a secondary light 602.

In some embodiments, such as where vehicles are employing Adaptive Driving Beam ("ADB") or "Smart Headlights", the primary and/or secondary headlight may comprise an array of independently controlled light sources. In such embodiments, modulation of headlight characteristics may be achieved by altering a portion of the independently controlled light sources within the primary and/or secondary housing such that the portion of light sources emit dimmer and/or a different color of light. The headlight characteristics (e.g., the shape of the area illuminated, the color of the area illuminated) change according to the specific portion of light sources that were altered and how the emitted light was altered.

In some embodiments, the primary and/or secondary headlight may comprise an array of independently controlled shutters positioned near the light source(s) within the headlight casing, such that the shutters may be actuated to block light from one or more light sources within the headlight casing. In such embodiments, modulation of headlight characteristics may be achieved by actuating one or more of the shutters to block a portion of light emitted by one or more light sources within the headlight casing. The headlight characteristics (e.g., the shape of the area illuminated) change according to the specific portion of light sources that were blocked and how much of their emitted light was blocked.

FIGS. 7A-C illustrate how headlight characteristic modulation alerts may scale with increasing likelihood of unplanned disengagement. FIG. 7A depicts a scenario where subject car 701A deploying an embodiment of the invention disclosed herein may react to a likelihood of unplanned disengagement calculated based on a detected lead car 702A travelling at roughly the same speed as the subject car 701A. Subject car 701A collects data from the above disclosed sensors and databases and detects that the lead car 702A ahead is not being operated in a way to close the distance between the two cars. Based on this, subject car 701A calculates a likelihood of unplanned disengagement below any threshold meant to trigger a headlight characteristic modulation to warn the driver. As a result, the corresponding graph of luminosity versus time 703A shows that the headlights continue to shine at their normal operating luminosity x, not alerting the occupants of subject car 701A of any need to prepare to assume driving roles.

FIG. 7B depicts a scenario where subject car 701B reacts to a likelihood of unplanned disengagement calculated based on detected lead car 702B braking slightly such that lead car 702B appears, relatively speaking, to begin approaching subject car 701B. Subject car 701B collects data from the above disclosed sensors and databases and detects that the lead car 702B ahead is being operated in a way to close the distance between the two cars. Based on this, subject car 701B calculates a likelihood of unplanned disengagement a first threshold meant to trigger a headlight characteristic modulation to warn the driver. As a result, the corresponding graph of luminosity versus time 703B shows that the headlights begin to pulse brighter at a first frequency, alerting the occupants of subject car 701B of a raised chance that they may be required to assume driving roles.

FIG. 7C depicts a scenario where subject car 701C reacts to a likelihood of unplanned disengagement calculated based on detected lead car 702C braking harshly such that lead car 702C appears, relatively speaking, to be approaching subject car 701C at a rapid pace. Subject car 701C collects data from the above disclosed sensors and databases and detects that the lead car 702C ahead is being operated in a way to rapidly close the distance between the two cars. Based on this, subject car 701C calculates a likelihood of unplanned disengagement above a second threshold meant to trigger an aggressive headlight characteristic modulation to warn the driver. As a result, the corresponding graph of luminosity versus time 703C shows that the headlights begin to pulse brighter at a second frequency above the first frequency disclosed in graph 703B, alerting the occupants of subject car 701C of a high chance that they will be required to assume driving roles imminently.

FIGS. 8A-C illustrate how the type of headlight characteristic modulation alerts may be tailored to specific sources of raised likelihood of unplanned disengagement. FIG. 8A depicts a scenario where subject car 801A deploying an embodiment of the invention disclosed herein may react to a likelihood of unplanned disengagement calculated based on a detected upcoming road geometry 802A requiring a sharp right turn of the subject car 801A. Subject car 801A collects data from the above disclosed sensors and databases and detects that the upcoming road geometry 802A requires a turn too sharp for the DAS to handle. Based on this, subject car 801A determines that a headlight characteristic modulation that pans the headlights in the direction of the turn would alert the driver of both the relative likelihood of unplanned disengagement and the source of the raised likelihood of unplanned disengagement. As a result, the horizontal rotational motors attached to subject car 801A's right headlight 803A are operated to pan the right headlight to the right. In some embodiments, the headlight may further be panned back to the default center position at a frequency that scales with the magnitude of likelihood of unplanned disengagement.

FIG. 8B depicts a scenario where subject car 801B deploying an embodiment of the invention disclosed herein may react to a likelihood of unplanned disengagement calculated based on a detected rainstorm 802B indicating wet road ahead. Subject car 801B collects data from the above disclosed sensors and databases and detects that the upcoming rain storm 802B and the resulting wettened roads raise the likelihood of unplanned disengagement. Based on this, subject car 801B determines that a headlight characteristic modulation that smoothly oscillates the secondary lights (fog lights in this case) on and off would alert the driver of both the relative likelihood of unplanned disengagement and the source of the raised likelihood of unplanned disengagement. Luminosity versus time chart 804B indicates a potential waveform that the fog lights may be oscillated with. As a result, the fog lights smoothly oscillate a yellow hue onto the road nearest the subject vehicle 801B, and the occupants of subject vehicle 801B understand that the smooth oscillation and yellow hue indicate that wet roads are raising the likelihood of an unplanned disengagement in the near future. In some embodiments, the magnitude and/or frequency of the secondary oscillation may further be increased to communicate to scale with an increasing likelihood of unplanned disengagement.

FIG. 8C depicts a scenario where subject truck 801C deploying an embodiment of the invention disclosed herein may react to a likelihood of unplanned disengagement calculated based on a detected upcoming tunnel 802C, wherein the upcoming tunnel 802C is at a height insufficient for the subject truck 801C to pass through. Subject car 801C collects data from the above disclosed sensors and databases and detects that the upcoming tunnel 802C cannot be navigated by the DAS. Based on this, subject car 801C determines that a headlight characteristic modulation that pans the secondary lights 803C (in this case, high beams) upward toward the top edge of the upcoming tunnel 802C would sufficiently alert the occupants of subject vehicle 801C of both the high likelihood of unplanned disengagement and the source of the raised likelihood of unplanned disengagement. As a result, the vertical rotational motors attached to subject car 801C's secondary lights 803C are operated to pan the secondary lights upward. The secondary lights may further be panned back down to the default center position at a frequency that scales with the magnitude of likelihood of unplanned disengagement.

Figure 9:
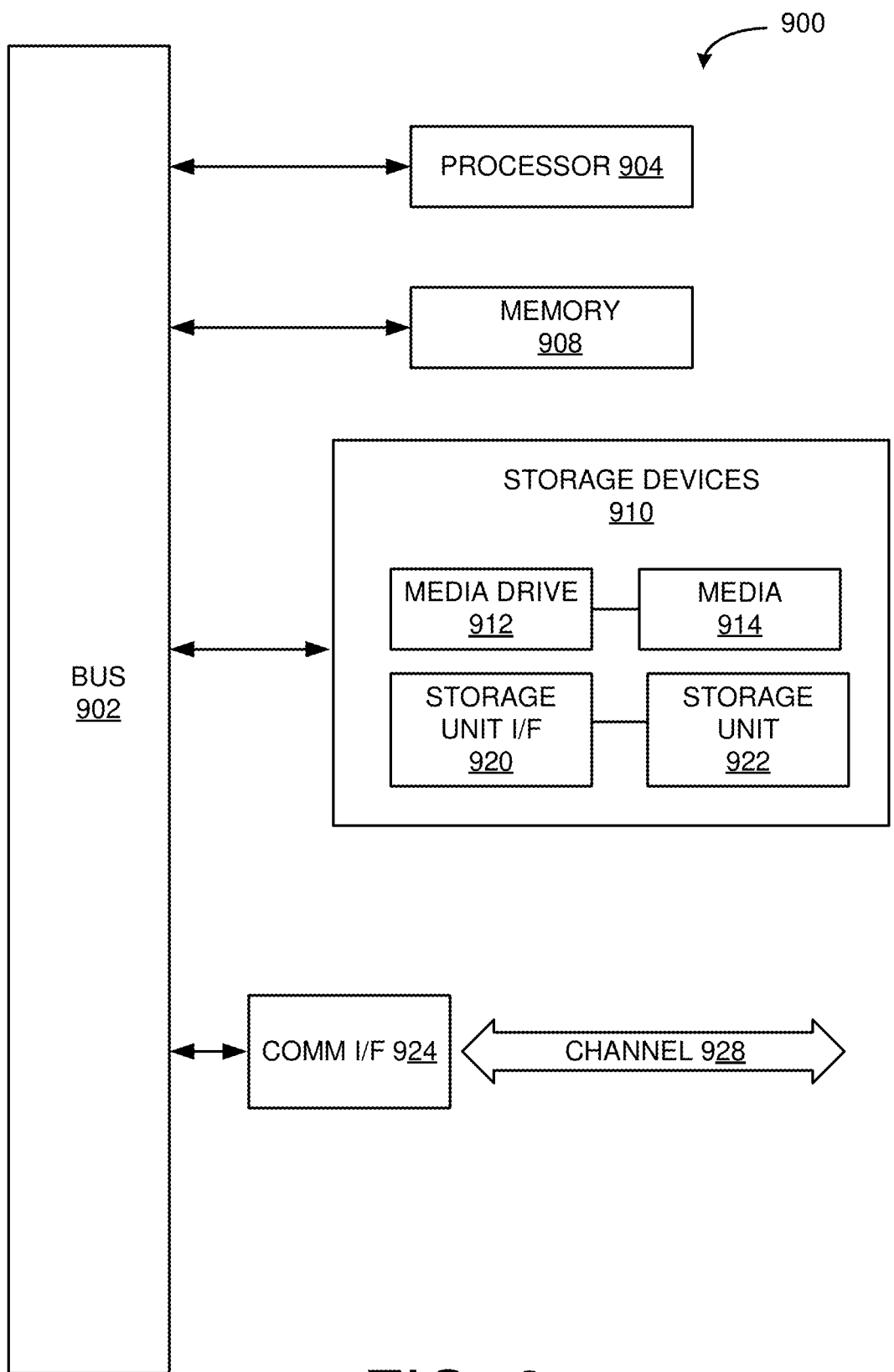
FIG. 9 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 9. Various embodiments are described in terms of this example-computing component 900. After reading this description, it will become apparent to a person skilled in the relevant art how to implement the application using other computing components or architectures.

Referring now to FIG. 9, computing component 900 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 900 might also represent computing capabilities embedded within or otherwise available to a given device. For example, a computing component might be found in other electronic devices such as, for example, portable computing devices, and other electronic devices that might include some form of processing capability.

Computing component 900 might include, for example, one or more processors, controllers, control components, or other processing devices. This can include a processor, and/or any one or more of the components making up HEV 100, autonomous control system 200, and network cloud 500. Processor 904 might be implemented using a general-purpose or special-purpose processing engine such as, for example, a microprocessor, controller, or other control logic. Processor 404 may be connected to a bus 902. However, any communication medium can be used to facilitate interaction with other components of computing component 900 or to communicate externally.

Computing component 900 might also include one or more memory components, simply referred to herein as main memory 908. For example, random access memory (RAM) or other dynamic memory, might be used for storing information and instructions to be executed by processor 904. Main memory 908 might also be used for storing temporary variables or other intermediate information during execution of instructions to be executed by processor 904. Computing component 900 might likewise include a read only memory ("ROM") or other static storage device coupled to bus 902 for storing static information and instructions for processor 904.

The computing component 900 might also include one or more various forms of information storage mechanism 910, which might include, for example, a media drive 912 and a storage unit interface 920. The media drive 912 might include a drive or other mechanism to support fixed or removable storage media 914. For example, a hard disk drive, a solid-state drive, a magnetic tape drive, an optical drive, a compact disc (CD) or digital video disc (DVD) drive (R or RW), or other removable or fixed media drive might be provided. Storage media 914 might include, for example, a hard disk, an integrated circuit assembly, magnetic tape, cartridge, optical disk, a CD or DVD. Storage media 914 may be any other fixed or removable medium that is read by, written to or accessed by media drive 912. As these examples illustrate, the storage media 914 can include a computer usable storage medium having stored therein computer software or data.

In alternative embodiments, information storage mechanism 910 might include other similar instrumentalities for allowing computer programs or other instructions or data to be loaded into computing component 900. Such instrumentalities might include, for example, a fixed or removable storage unit 922 and an interface 920. Examples of such storage units 922 and interfaces 920 can include a program cartridge and cartridge interface, a removable memory (for example, a flash memory or other removable memory component) and memory slot. Other examples may include a PCMCIA slot and card, and other fixed or removable storage units 922 and interfaces 920 that allow software and data to be transferred from storage unit 922 to computing component 900.

Computing component 900 might also include a communications interface 924. Communications interface 924 might be used to allow software and data to be transferred between computing component 900 and external devices. Examples of communications interface 924 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 924 may be carried on signals, which can be electronic, electromagnetic (which includes optical) or other signals capable of being exchanged by a given communications interface 924. These signals might be provided to communications interface 924 via a channel 928. Channel 928 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 908, storage unit 920, media 914, and channel 928. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 900 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method of alerting an occupant of a vehicle employing a driving automation system ("DAS"), the method comprising:
   receiving data relating to a future driving environment;
   calculating a likelihood of unplanned disengagement of the DAS based on the data; and
   alerting the occupant by modulating headlight characteristics, wherein the intensity of the modulation is proportional with the calculated likelihood of unplanned disengagement of the DAS.

2. The method of claim 1, wherein the modulation of headlight characteristics comprises oscillating the luminosity of a light mounted to the vehicle in response to the calculated likelihood of unplanned disengagement of the DAS exceeding a threshold value.

3. The method of claim 1, wherein:
the vehicle comprises a headlight housing;
the headlight housing comprises a plurality of independently controlled light sources; and
the modulation of headlight characteristics comprises altering the lighting characteristics of an independently controlled light sources within the plurality of independently controlled light sources.

4. The method of claim 1, wherein:
the vehicle comprises a headlight housing;
the headlight housing comprises a plurality of independently controlled shutters; and
the modulation of headlight characteristics comprises actuating an independently controlled shutter within the plurality of independently controlled light sources, wherein the actuating of the independently controlled shutter results in blocking of light emitted from a light source within the headlight housing.

5. The method of claim 1, wherein the modulation of headlight characteristics comprises rotating a light mounted to the vehicle along a horizontal plane in order to further indicate to the occupant that a source of the calculated likelihood of unplanned disengagement of the DAS includes a change in road geometry.

6. The method of claim 1, wherein the modulation of headlight characteristics comprises rotating a light mounted to the vehicle along a vertical plane in order to further indicate to the occupant that a source of the calculated likelihood of unplanned disengagement of the DAS includes a detected obstacle in the path of the vehicle.

7. The method of claim 1, wherein the modulation of headlight characteristics comprises activating a light mounted to the vehicle, wherein the light emits a color different from the color of light emitted by a second light mounted to the vehicle.

8. The method of claim 1, wherein the data was recorded by a device housed off the vehicle and communicated to the vehicle via a network.

9. The method of claim 1, wherein the calculating of the likelihood of unplanned disengagement of the DAS was executed by a processor housed off the vehicle and communicated to the vehicle via a network.

10. A system of alerting an occupant of a vehicle employing a driving automation system ("DAS"), the system comprising:
a controller connected to a light mounted to the vehicle;
a processor; and
a memory coupled to the processor to store instructions, which when executed by the processor, cause the processor to perform operations, the operations comprising:
receiving data relating to a future driving environment;
calculating a likelihood of unplanned disengagement of the DAS based on the data; and
alerting the occupant by modulating headlight characteristics, wherein the intensity of the modulation is proportional with the calculated likelihood of unplanned disengagement of the DAS.

11. The system of claim 10, wherein the modulation of headlight characteristics comprises:
oscillating the luminosity of the light mounted to the vehicle at a first frequency in response to the calculated likelihood of unplanned disengagement of the DAS exceeding a first threshold value; and
oscillating the luminosity of the light mounted to the vehicle at a second frequency in response to the calculated likelihood of unplanned disengagement of the DAS exceeding a second threshold value.

12. The system of claim 10, wherein:
the light mounted to the vehicle comprises a headlight housing;
the headlight housing comprises a plurality of independently controlled light sources; and
the modulation of headlight characteristics comprises altering the lighting characteristics of an independently controlled light sources within the plurality of independently controlled light sources.

13. The system of claim 10, wherein:
the light mounted to the vehicle comprises a headlight housing;
the headlight housing comprises a plurality of independently controlled shutters; and
the modulation of headlight characteristics comprises actuating an independently controlled shutter within the plurality of independently controlled light sources, wherein the actuating of the independently controlled shutter results in blocking of light emitted from a light source within the headlight housing.

14. The system of claim 10, wherein the modulation of headlight characteristics comprises rotating the light mounted to the vehicle along a horizontal plane in order to further indicate to the occupant that a source of the calculated likelihood of unplanned disengagement includes a change in road geometry.

15. The system of claim 10, wherein the modulation of headlight characteristics comprises rotating the light mounted to the vehicle along a vertical plane in order to further indicate to the occupant that a source of the calculated likelihood of unplanned disengagement includes a detected obstacle in the path of the vehicle.

16. The system of claim 10, further comprising a second light mounted to the vehicle, wherein the modulation of headlight characteristics comprises activating the light mounted to the vehicle, wherein the light emits a color different from the color of light emitted by a second light mounted to the vehicle.

17. A non-transitory machine-readable medium having instructions stored therein, which when executed by a processor, cause the processor to perform operations, the operations comprising:
receiving data relating to a future driving environment of a vehicle;
calculating a likelihood of unplanned disengagement of a driving automation system ("DAS") based on the data; and
alerting an occupant of the vehicle by modulating headlight characteristics, wherein the intensity of the modulation is proportional with the calculated likelihood of unplanned disengagement of the DAS.

18. The non-transitory machine-readable medium of claim 17, wherein the modulation of headlight characteristics comprises oscillating the luminosity of a light mounted to the vehicle in response to the calculated likelihood of unplanned disengagement of the DAS exceeding a threshold value.

19. The non-transitory machine-readable medium of claim 17, wherein:
the vehicle comprises a headlight housing;
the headlight housing comprises a plurality of independently controlled light sources; and the modulation of headlight characteristics comprises altering the lighting characteristics of an independently controlled light sources within the plurality of independently controlled light sources.

20. The non-transitory machine-readable medium of claim 17, wherein:
the vehicle comprises a headlight housing;
the headlight housing comprises a plurality of independently controlled shutters; and
the modulation of headlight characteristics comprises actuating an independently controlled shutter within the plurality of independently controlled light sources, wherein the actuating of the independently controlled shutter results in blocking of light emitted from a light source within the headlight housing.

* * * * *